(12) United States Patent
Marcinkowski et al.

(10) Patent No.: US 12,534,815 B2
(45) Date of Patent: Jan. 27, 2026

(54) CHEMICAL SOLUTION PRODUCTION

(71) Applicant: HCI Cleaning Products LLC, Westford, MA (US)

(72) Inventors: Stanley Marcinkowski, Peabody, MA (US); David Owens, Salisbury, MD (US); David Bryant Snaith, Toronto (CA); Boqing Wang, Chiba (JP); Atsushi Shikanai, Chiba (JP)

(73) Assignee: HCI Cleaning Products LLC, Hollis, NH (US)

( * ) Notice: Subject to any disclaimer, the term of this patent is extended or adjusted under 35 U.S.C. 154(b) by 692 days.

(21) Appl. No.: 17/773,510

(22) PCT Filed: May 22, 2020

(86) PCT No.: PCT/US2020/034376
§ 371 (c)(1),
(2) Date: Apr. 29, 2022

(87) PCT Pub. No.: WO2021/086446
PCT Pub. Date: May 6, 2021

(65) Prior Publication Data
US 2022/0403534 A1 Dec. 22, 2022

Related U.S. Application Data

(63) Continuation-in-part of application No. 16/670,852, filed on Oct. 31, 2019, now Pat. No. 11,105,011, and (Continued)

(51) Int. Cl.
*C25B 9/17* (2021.01)
*C25B 1/26* (2006.01)
(Continued)

(52) U.S. Cl.
CPC ............. *C25B 9/17* (2021.01); *C25B 1/26* (2013.01); *C25B 11/02* (2013.01); *C25B 15/08* (2013.01); *C25B 1/34* (2013.01)

(58) Field of Classification Search
CPC .... C25B 1/26; C25B 1/34; C25B 9/17; C25B 11/02; C25B 15/08
See application file for complete search history.

(56) References Cited

U.S. PATENT DOCUMENTS

2006/0060464 A1 3/2006 Chang
2007/0173710 A1 7/2007 Petisce et al.
(Continued)

FOREIGN PATENT DOCUMENTS

CN 100469300 C 3/2009
GB 2494859 A * 3/2013 ............. C25B 11/00
(Continued)

OTHER PUBLICATIONS

Extended European Search Report for European Pat. Appl. No. 20883571.0, Jul. 2, 2024, 7 pages.
(Continued)

*Primary Examiner* — Ciel P Contreras
(74) *Attorney, Agent, or Firm* — Danielson Legal LLC

(57) ABSTRACT

Solution production devices, systems, and methods. The system includes a base portion configured to receive a vessel containing a liquid. Upon the base portion receiving the vessel, liquid is transferred from the vessel and into the base portion where it undergoes an electrochemical reaction to produce a cleaning solution. The cleaning solution is then circulated back into the vessel.

16 Claims, 21 Drawing Sheets

Related U.S. Application Data a continuation-in-part of application No. 29/711,570, filed on Oct. 31, 2019, now Pat. No. Des. 952,185, said application No. 16/670,852 is a continuation-in-part of application No. 15/850,922, filed on Dec. 21, 2017, now abandoned, which is a continuation-in-part of application No. 15/013,429, filed on Feb. 2, 2016, now abandoned.

(60) Provisional application No. 62/110,889, filed on Feb. 2, 2015.

(51) Int. Cl.
*C25B 1/34* (2006.01)
*C25B 11/02* (2021.01)
*C25B 15/08* (2006.01)

(56) References Cited

U.S. PATENT DOCUMENTS

| | | | |
|---|---|---|---|
| 2009/0314658 A1 | 12/2009 | Field | |
| 2015/0197863 A1* | 7/2015 | Kim | C25B 11/03 |
| | | | 204/242 |
| 2016/0330968 A1* | 11/2016 | Owens | C01B 11/04 |

FOREIGN PATENT DOCUMENTS

| | | | | |
|---|---|---|---|---|
| JP | 2005111356 A * | 4/2005 | | C02F 1/46 |
| WO | WO-2018040051 A1 * | 3/2018 | | C02F 1/46 |
| WO | 2019/126809 A1 | 6/2019 | | |

OTHER PUBLICATIONS

International Search Report for PCT/US2020/034376, Aug. 25, 2020, 2 pages.
Written Opinion for PCT/US2020/034376, Aug. 25, 2020, 5 pages.

* cited by examiner

CHEMICAL SOLUTION PRODUCTION

CROSS-REFERENCE TO RELATED APPLICATIONS

This application is the national phase of Int'l (PCT) Pat. Appl. No. PCT/US2020/034376, filed internationally on May 22, 2020, and claims the benefit of and priority to U.S. patent application Ser. No. 16/670,852, filed on Oct. 31, 2019, and now issued as U.S. Pat. No. 11,105,011 on Aug. 31, 2021, which claims priority to U.S. patent application Ser. No. 15/850,922, filed on Dec. 21, 2017, which itself claims priority to U.S. patent application Ser. No. 15/013,429, filed on Feb. 2, 2016, which in turn claims priority to U.S. Prov. Pat. Appl. No. 62/110,889, filed on Feb. 2, 2015. This application also claims the benefit of and priority to U.S. Des. patent application Ser. No. 29/711,570, filed on Oct. 31, 2019. The entire disclosure of each of these applications are hereby incorporated by reference as if set forth in their entirety herein.

TECHNICAL FIELD

Embodiments described herein generally relate to the production of chemical solutions, and more specifically to the production of a chemical cleaning solution.

BACKGROUND

The use of electricity in the production of chemical solutions is known. Many of these systems rely on semipermeable membranes to mechanically isolate the anodes and cathodes of an electrolyzing cell while permitting ion transfer between the anodes and cathodes to complete an electrical circuit.

Existing techniques reliant on this chemistry generally create solutions in volumetric systems. This requires the transfer of the solution from the system into the desired end products. This inevitably requires additional manufacturing and production resources.

A need exists, therefore, for systems, methods, and devices that overcome this disadvantage.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a solution production system. The system includes a vessel configured to contain a liquid, the vessel having a base portion including: an anode; a first perimeter spacer; a cathode spaced from the anode by the first perimeter spacer to facilitate an electrochemical reaction with the liquid to produce at least one of a bubble flow and a product solution; wherein the base portion is configured to transport the at least one of the bubble flow and the product solution from the base portion into to the vessel without pumping.

In some embodiments, the cathode and the anode are fixedly attached to the base portion. In some embodiments, the cathode and the anode are ultrasonically welded to the base portion. In some embodiments, the base portion further includes a brace that maintains the spacing between the anode and the cathode. In some embodiments, the system includes a second perimeter spacer. In some embodiments, the base portion further includes an electrical port and a water-proof seal over the electrical port. In some embodiments, the first perimeter spacer is a polytetrafluoroethylene spacer. In some embodiments, the base portion further comprises a mesh covering and the base portion is configured to transport the at least one of the bubble flow and the product solution through the mesh covering. In some embodiments, the first perimeter spacer includes a solid median bar and a perimeter, and the median bar has the same width and thickness as the perimeter. In some embodiments, the cathode includes two planar sections and a wraparound section attached to the two planar sections; and the anode is positioned between the two planar sections of the cathode such that a top edge of the anode is co-planar with each top edge of the two planar sections of the cathode. In some embodiments, the system further includes a third electrode spaced from the anode and the cathode with the second perimeter spacer.

According to another aspect, embodiments relate to a method of manufacturing a solution production device. The method includes positioning an anode in a base portion; positioning a first perimeter spacer in the base portion; positioning a cathode in the base portion spaced apart from the anode by the first perimeter spacer; and attaching a vessel to the base portion; wherein the base portion is configured to transport a product of an electrochemical reaction with the cathode, the anode, and a liquid to the vessel without pumping.

In some embodiments, the method further includes attaching a brace to the anode and the cathode to maintain spacing between the anode and the cathode. In some embodiments, the method further includes positioning a second perimeter spacer in the base portion and positioning the cathode in the base portion spaced apart from the anode by the second perimeter spacer, wherein the cathode and the anode are configured such that the first and second perimeter spacer prevent the cathode and the anode from physically contacting each other.

According to yet another aspect, embodiments relate to a solution production device. The device includes a base portion having an anode and a cathode spaced apart with a first perimeter spacer to generate, upon receiving an electrical current, an electrochemical reaction with a liquid to produce at least one of a bubble flow and a product solution; and a container fixedly attached to the base portion and configured to receive without pumping the at least one of the bubble flow and the product solution from the base portion.

In some embodiments, the device further includes a power source configured to apply the current to the anode and the cathode to generate the electrochemical reaction. In some embodiments, the device further includes a brace configured to maintain the spacing between the anode and the cathode. In some embodiments, the cathode includes two planar sections and a wraparound section attached to the two planar sections; and the anode is positioned between the two planar sections of the cathode such that a top edge of the anode is co-planar with each top edge of the two planar sections of the cathode. In some embodiments, the device further includes a second perimeter spacer, wherein the first perimeter spacer and the second perimeter spacer are secured between the anode and the cathode. In some embodiments, the cathode is configured to enclose the anode on three sides of the anode.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
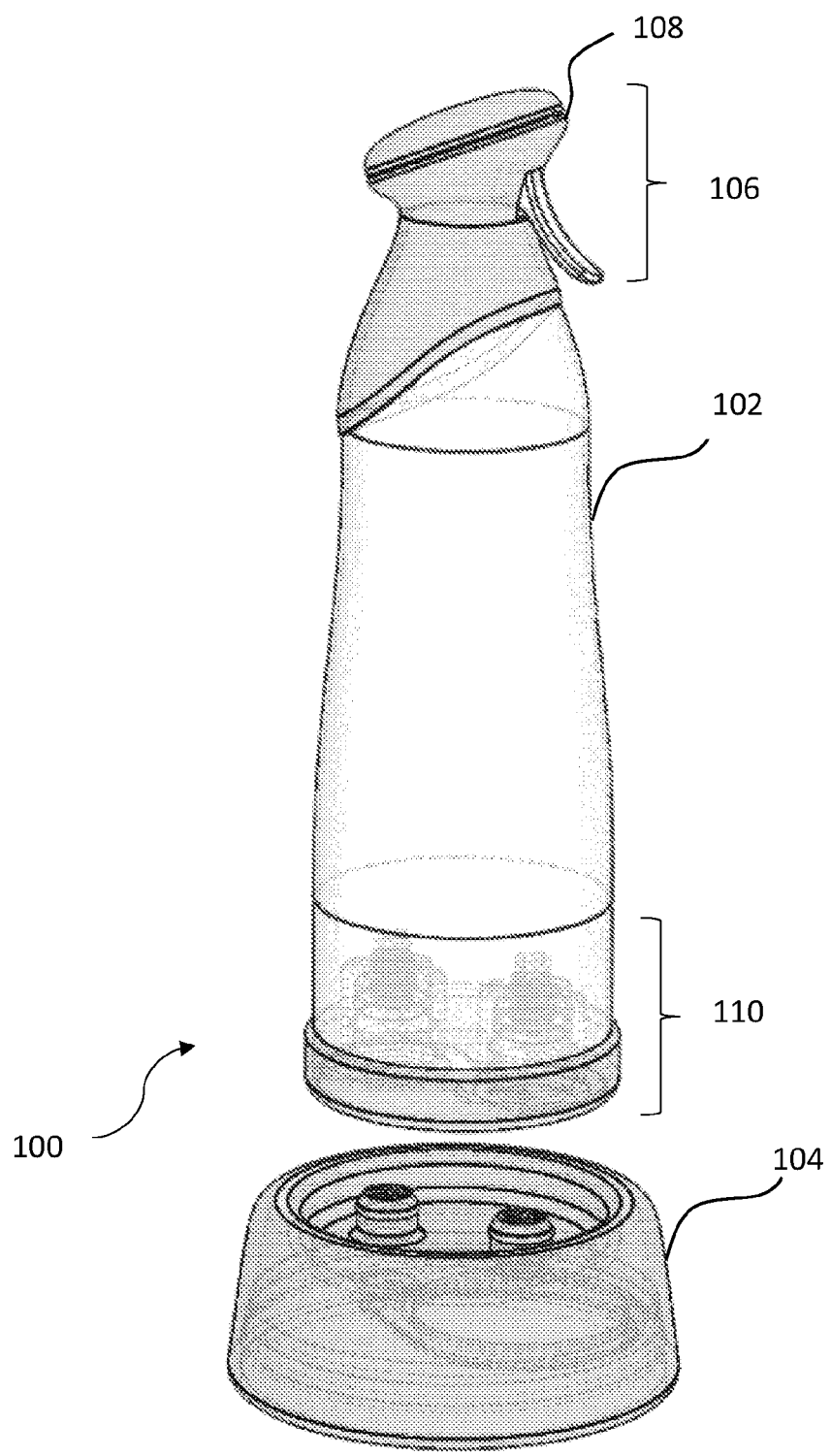
FIG. 1 illustrates a perspective view of a solution production system in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily referring to the same embodiments.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Features of various embodiments described herein disclose novel solution production systems, methods, and devices. The systems in accordance with various embodiments include a base portion with a power source, a control circuit and/or electronics, at least one anode, at least one cathode, and a means to maintain the spacing between the anode(s) and the cathode(s). The system further includes a liquid-containing vessel that can be removably attached to the base portion.

Once the vessel is attached to the base portion, liquid within the vessel may flow from the vessel into the base portion through a base portion inlet. A current may be applied to the liquid between the anode(s) and the cathode(s) to produce a bubble flow and a product solution. The bubble flow and/or the product solution may then flow back into the vessel, thereby filling the vessel with the product solution.

The product solution may be a cleaning solution that can be used in sanitizing applications, surfaces, volumes, systems, and venues including, but not limited to, restaurants, tables, pools, aquariums, military applications, third-world applications, areas of infectious disease outbreaks, door handles, knobs, airplanes, cruise ships, trains and rail cars, busses, taxis, cars, healthcare institutions, schools, airports, bus terminals, train stations, pipelines, restrooms, home exterior cleaning, industrial exterior cleaning, home filtration systems, refrigeration systems, misters, dishwashers, ice machines, HVAC systems, humidifiers, dehumidifiers, environmental control systems, locker rooms, public showers, prisons, detention centers interrogation rooms, play pens, ball pens, day care centers, playgrounds, play items, gymnasiums, gymnastic equipment and/or machinery, exercise equipment and/or machinery, churches, nursing homes, assisted living facilities, funeral homes, morgues, police stations nail salons, spas, cosmetics counters, sales counters, delicatessens, agricultural applications, green houses, hydroponics systems, water treatment facilities, gray water transport systems, systems using recycled water, fracking operations, waste treatment facilities, food processing plans, food processing machinery, robotic systems, medical treatment devices, or the like.

FIG. 1 illustrates a solution production system 100 in accordance with one embodiment. The system 100 includes a vessel 102 and a base portion 104 configured to receive the vessel 102. The vessel 102 may contain a liquid such as a cleaning solution generated by the electrochemical process discussed below. The vessel 102 may include an upper portion 106 with a dispenser 108 to dispense liquid from the vessel 102. The vessel 102 may also include a lower portion 110 that contains any required mechanical, electrical, and/or chemical components to accomplish the various features described herein. The vessel 102 may be formed of glass, plastic, metal, non-metal material, or any other type of material capable of storing the chemical cleaning solution discussed herein.

The liquid initially in the vessel 102 can be water from any source mixed with at least one additive and/or distilled water that is mixed with at least one additive and/or any combination thereof. That additive may include at least one salt and/or at least one acid, for example. The acid may include any weak acid of an organic salt including, but not limited to, at least one of acetic acid, citric acid, lactic acid, malic acid, and may be between 0.001% and 26% by weight in total of initial solution concentration. The salt may include chloride containing salt derived from the class of alkali metals or equivalents including; but not limited to, sodium chloride, lithium chloride, potassium chloride, cesium chloride; pseudo alkali metals or equivalents such as ammonium chloride. The salt may be between 10 PPM and 20,000 PPM in total of initial concentration.

Figure 2:
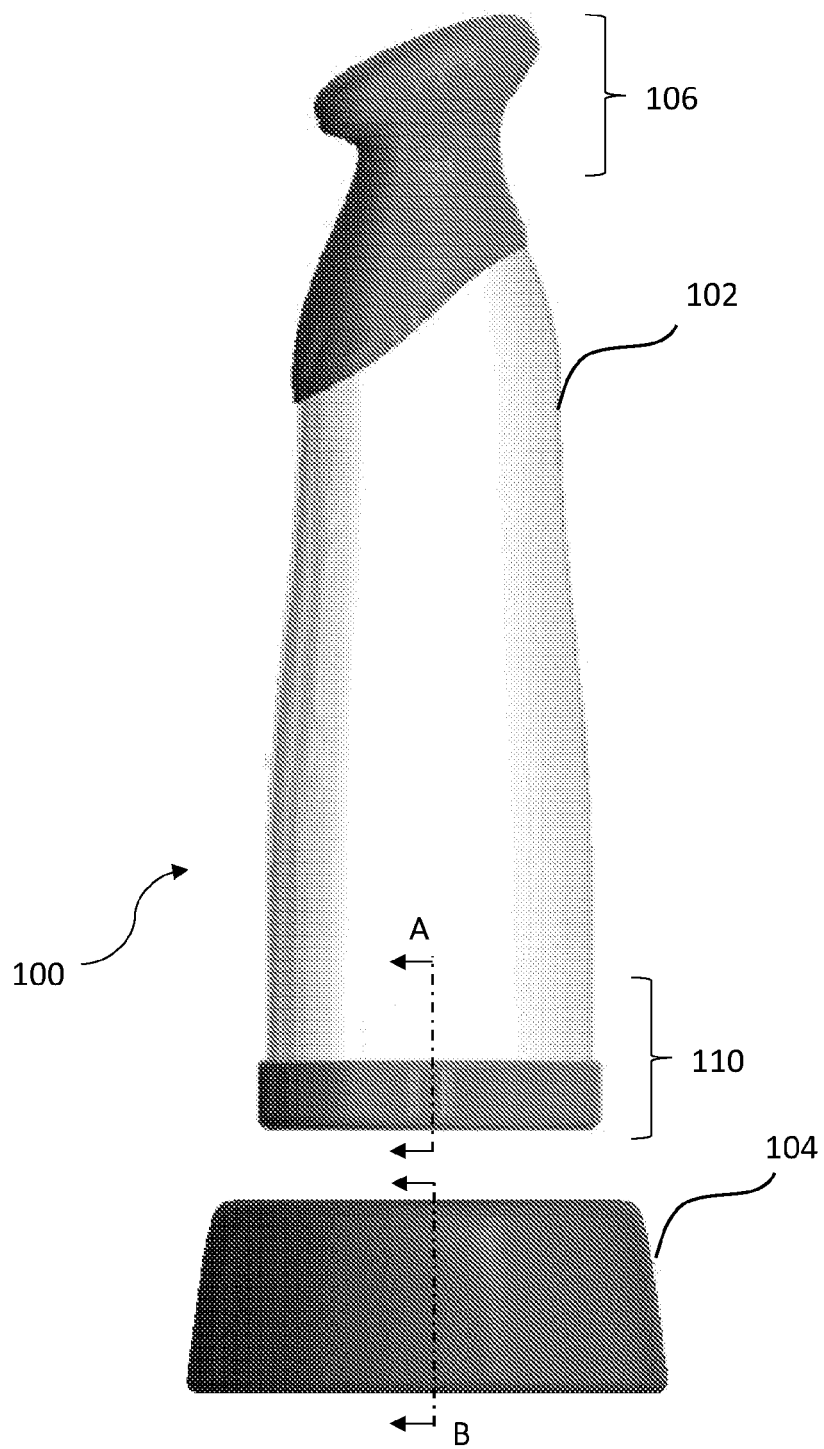
FIG. 2 illustrates a side view of a solution production system in accordance with one embodiment.

FIG. 2 illustrates a side view of the solution production system 100 of FIG. 1. The vessel 102 and the base portion 104 may be operably sized and shaped such that the base portion 104 can receive the vessel 102.

Figure 3:
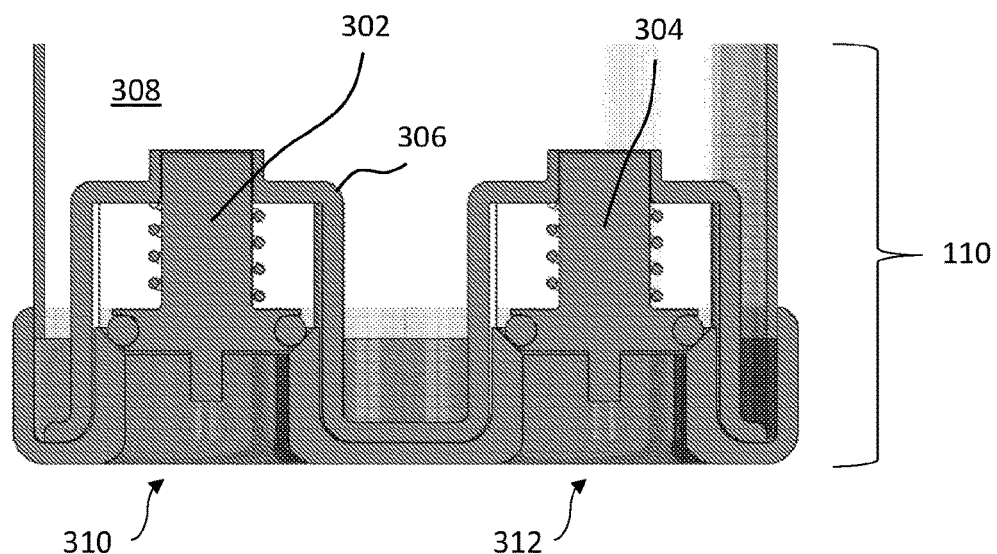
FIG. 3 illustrates a cross-sectional view of a bottom portion of a vessel in accordance with one embodiment.

FIG. 3 presents a view of the lower portion 110 of the vessel 102 taken along the line 'A' of FIG. 2. As seen in FIG. 3, the lower portion includes valves 302 and 304 which may be spring loaded valves. The valves 302 and 304 may be secured in the lower portion 110 of the vessel by a frame 306.

The valves 302 and 304 may restrict or otherwise prevent liquid 308 from leaving the vessel 102 through the lower portion 110 until the vessel 102 is connected with the base portion 104. As seen in FIG. 3, valve 302 is operably positioned with respect to the vessel outlet 310 and valve 304 is operably positioned with respect the vessel inlet 312.

Although the valves 302 and 304 are illustrated as spring loaded valves, other types of valves may be used. For example, the valves 302 and 304 may be configured as ball-check valves, mechanically-activated valves, electrically-activated valves, or the like. Any type of valve, whether available now or invented hereafter, may be used as long as they can accomplish the features of various embodiments described herein.

As discussed below, during the time that the vessel 102 is connected to or is otherwise received by the base portion 104, valve 302 may open to allow liquid 308 to flow from the vessel 102 and into the base portion 104. Then, after electrolysis (discussed below), the produced solution may enter the vessel 102 through the inlet port 312.

Figure 4:
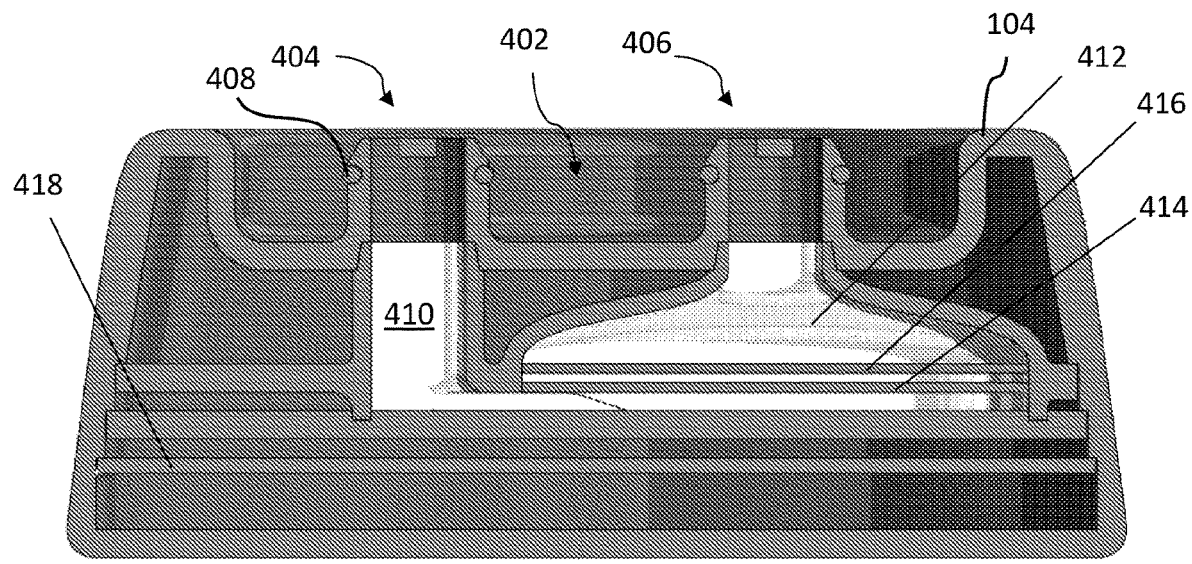
FIG. 4 illustrates a cross-sectional view of a base portion in accordance with one embodiment.

FIG. 4 illustrates a view of the base portion 104 taken along line 'B' of FIG. 2. As seen in FIG. 4, the base portion 104 includes a cavity 402 for receiving the vessel 102. Accordingly, the shape and size of the cavity 402 may be based on the shape and size of the lower portion 110 of the vessel 102 such that the cavity 402 can receive the vessel 102.

Also shown in FIG. 4 are a base portion inlet 404 and a base portion outlet 406 that are each configured with seals 408. The base portion inlet 404 is configured to receive the vessel outlet 310 of FIG. 3, and the base portion outlet 406 is configured to receive the vessel inlet 312 of FIG. 3.

The base portion 104 may further include a flow path 410 which the liquid from the vessel 102 traverses. That is, the liquid may enter the base portion inlet 404, traverse the flow path 410, and exit the base portion outlet 406.

The base portion 104 also includes a housing 412, at least one anode 414, at least one cathode 416 spaced apart from the anode(s) 414, and any required electrical connections between the anode(s) 414 and cathode(s) 416. As the liquid traverses the flow path 410, the liquid undergoes an electrochemical reaction via the anode(s) 414 and cathode(s) 416 to produce the product solution. The resultant product solution may then travel through the base outlet portion 406 and into the connected vessel 102 via the inlet port 312.

The anode(s) 414 and cathode(s) 416 can be constructed from a conductive material that can include at least one coating to act as a catalyst. The conductive material and the coating may be the same for the anode(s) 414 and the cathode(s) 416. The anode(s) 414 and/or the cathode(s) 416 can each comprise in whole or in part a conductive screen and/or a perforated conductive material.

The anode(s) 414 and/or the cathode(s) 416 can be printed on a substrate, such as by thermoforming and/or in-molding techniques. In the context of the present application, "in-molding" refers to a process by which a conductive element is molded within an element that can be plastic or another thermoformable material, and can employ injection molding, thermoforming, casting, and/or blow molding. However, any other technique for forming the anode(s) 414 and the cathode(s) 416, whether known now or invented hereafter, may be used as long as the anode(s) 414 and the cathode(s) 416 can accomplish the features of various embodiments described herein.

Figure 5:
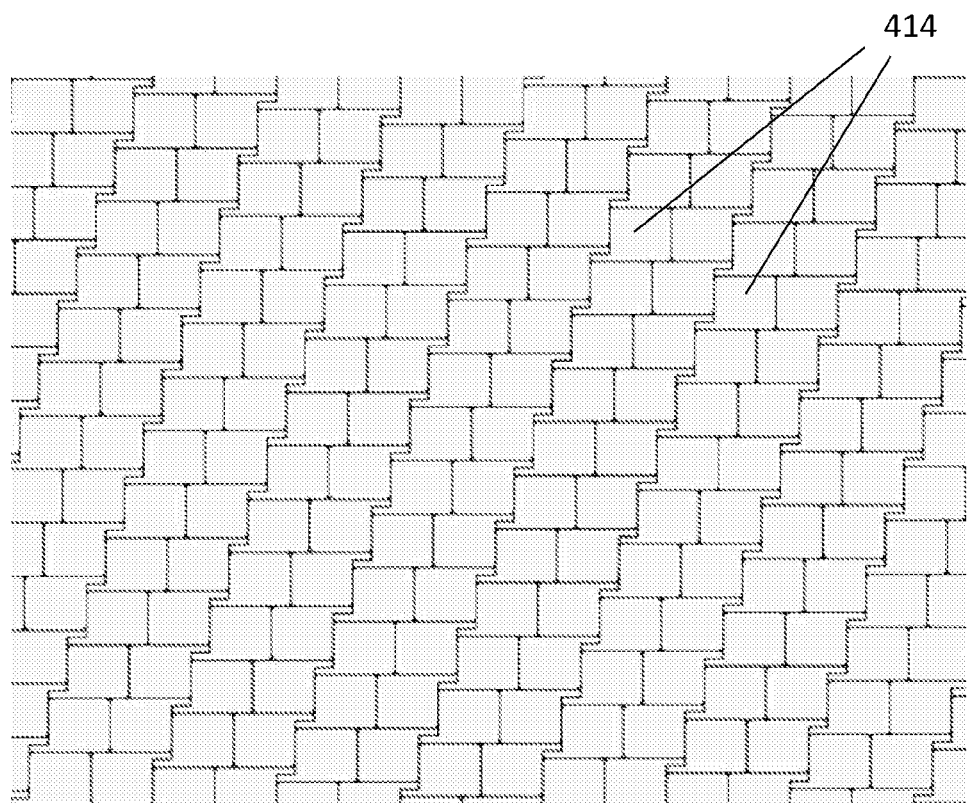
FIG. 5 illustrates a plurality of stacked anodes in accordance with one embodiment.

The anode(s) 414 and the cathode(s) 416 may be in a planar configuration or in a stacked configuration (e.g., a single cathode 416 can be positioned between two anodes 414). In some embodiments, the anode(s) 414 may be in a stacked configuration such as that illustrated in FIG. 5. In some embodiments, the total anode area may be in the range of 1,565 mm$^2$-1,750 mm$^2$.

The anode(s) 414 and the cathode(s) 416 may also be separated by at least one insulating material. The exact configuration and type of anode(s) 414 and cathode(s) 416 may vary and include those described in Applicant's U.S. Pat. Appl. Publ. No. 2016/0330968, entitled "SANITIZING PRODUCT CREATION SYSTEM," the entire contents of which are hereby incorporated by reference in their entirety.

Referring back to FIG. 4, the base portion 104 may also include any required electronic circuitry 418 (e.g., a printed circuit board) as well as one or more power sources. The power source(s) can produce a current density in the anode(s) 414 and the cathode(s) 416 in the range of 100 mA/cm$^2$ to 500 mA/cm$^2$, for example. The circuitry 418 may further include at least one current pass element and/or at least one means to measure current (e.g., a current sense resistor, a Hall Effect sensor, coils, or the like).

The power source can produce a voltage that can favor the production of hypochlorous acid. Hypochlorous acid can be produced at a concentration in the range of 100-500 PPM, or at a concentration that is variable. The power source can produce a voltage that can favor the production of sodium hydroxide. Or, the voltage can produce both sodium hydroxide and hypochlorous acid.

The power source can provide direct current or alternating current. The power source can be an uncontrolled power source and/or supply random AC and/or DC voltage waveforms. The power source can also supply random AC and/or DC voltage waveform components. The direct current can be produced by at least one of a battery, fuel cell, solar cell, thermoelectric source, nuclear source, magnetic generator, or a generator that interacts with any source of mechanical energy. The direct current can be derived from the rectification of alternating current. The direct current can be half-wave or full-wave rectified alternating current. The direct current can be transformed using a control circuit and/or electronics to produce a predominantly constant current.

The power source(s) can include a transformer and/or power and/or voltage transformation system. The power source can produce a voltage between +10.5 and −10.5 volts, and the direct current can result in the creation of a variable current. The current density in the anode(s) 414 and the cathode(s) 416 can be in the range of 100-500 mA/cm², for example.

The base portion 104 and/or the vessel 102 may include a means to measure pH by producing at least one pH signal. The pH signal can be used to provide feedback and/or to determine when to terminate a reaction by switching current off and/or altering the flow of current between the electrodes.

The systems, methods, and apparatuses described herein can further include the ability to control and/or alter the pH of at least one liquid or a solution containing reactants. As discussed in more detail below, the starting liquid can be water from any source mixed with at least one additive and/or distilled water mixed with the additive(s). The additive(s) can include salt and/or acid.

The acid may be a weak acid of an organic salt including, but not limited to, at least one of acetic acid, citric acid, lactic acid, and malic acid. The acid(s) can be between 0.001% and 26% by weight in total solution concentration.

The salt can be at least one chloride containing salt derived from the class of alkali metals or equivalents including but not limited to sodium chloride, lithium chloride, potassium chloride, cesium chloride, and rubidium, chloride, pseudo alkali metals or equivalents including but not limited to ammonium chloride. The at least one salt can be between 10 PPM and 20,000 PPM in total solution concentration.

The additive can be a self-contained and/or premixed mixture stored in packets that is added to a quantity of water in the vessel 102. The additive can further include a water softener.

Figure 6:
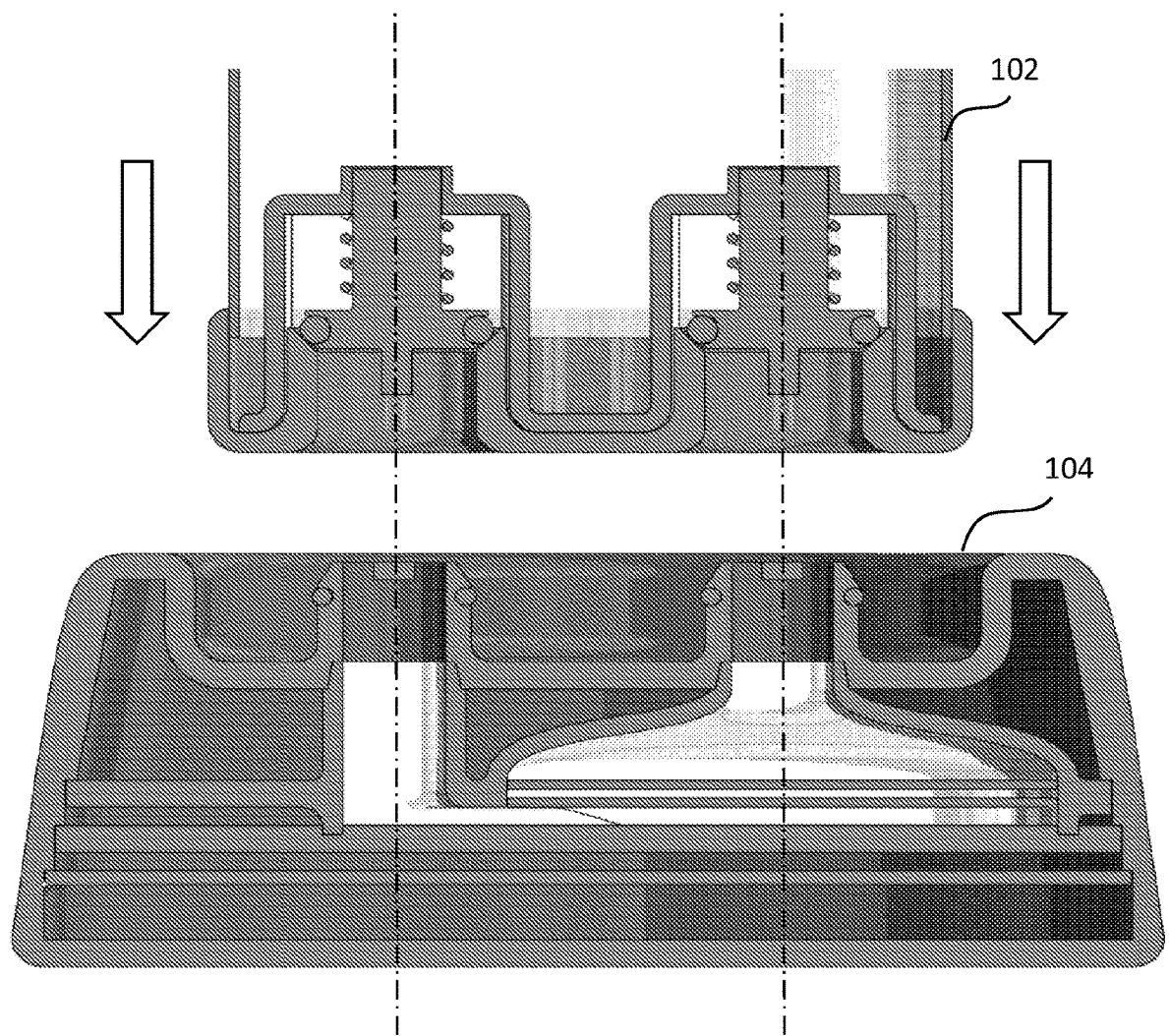
FIGS. 6-10 illustrate the vessel of FIG. 3 being inserted into the base portion of FIG. 4 in accordance with one embodiment.

FIG. 6 illustrates the vessel 102 being inserted into the base portion 104. In this embodiment, the vessel 102 may be filled with an initial solution including, for example, water, vinegar, and salt. Or, the initial solution may be poured into the vessel 102 after the vessel 102 is connected with the base portion 104.

Figure 7:
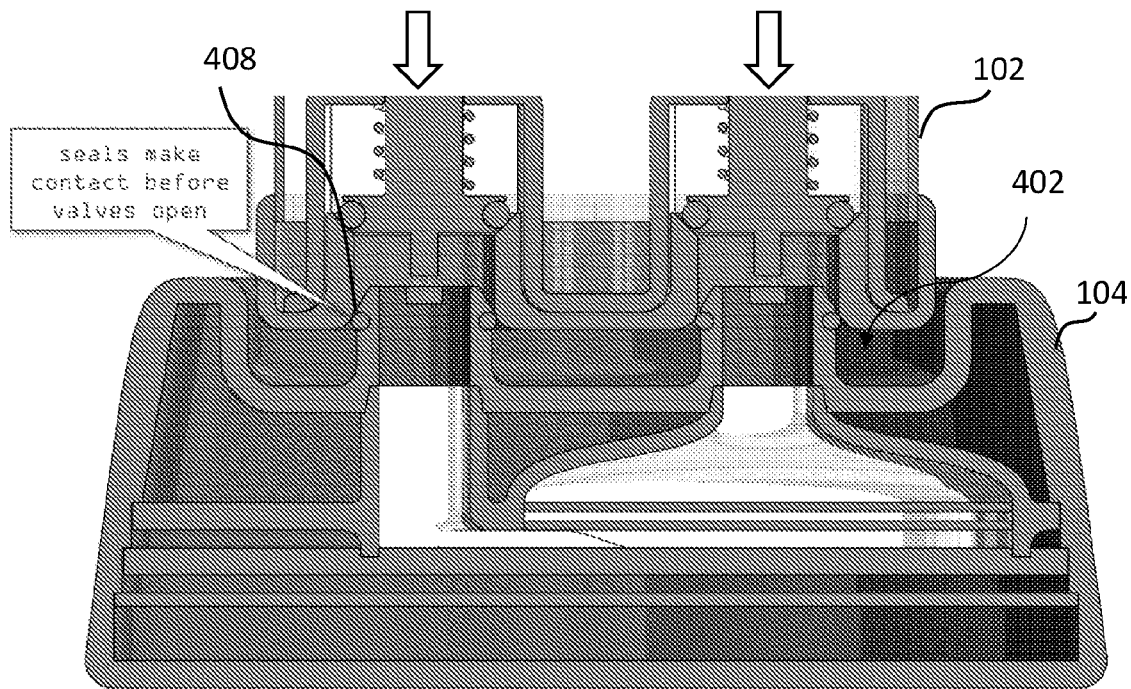

FIG. 7 illustrates the vessel 102 making contact with the base portion 104 as the vessel 102 is being inserted into the base portion 104. As seen in FIG. 7, the vessel 102 makes first contact with the seals 404 as the vessel 102 is being inserted into the cavity 402.

Figure 8:
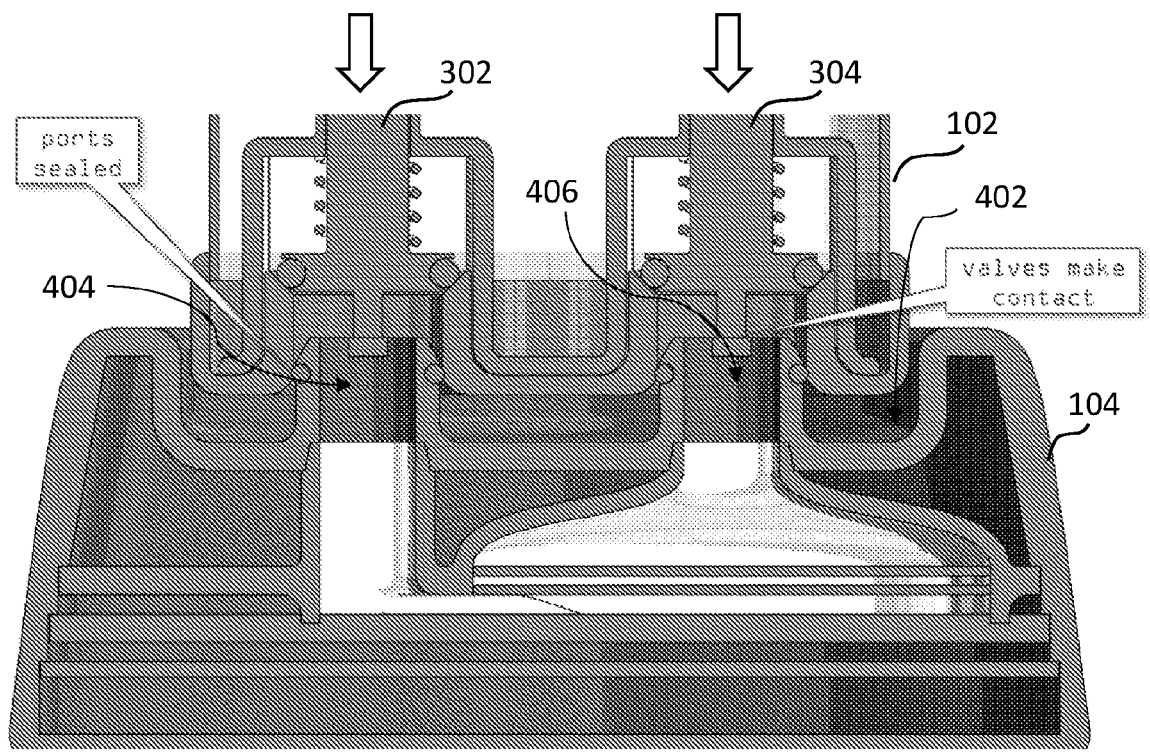

FIG. 8 illustrates the valves 302 and 304 making contact with the base portion 104. At this point, the inlet 404 and outlet 406 of the base portion 104 are sealed as the vessel 102 slides into the cavity 402.

Figure 9:
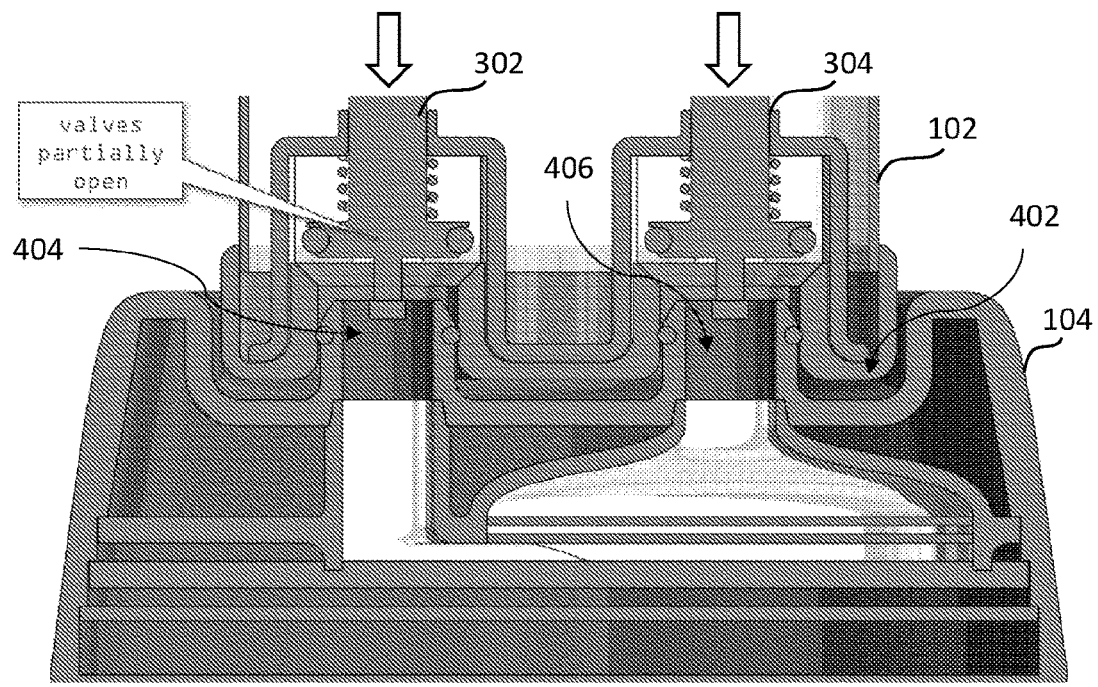
Figure 10:
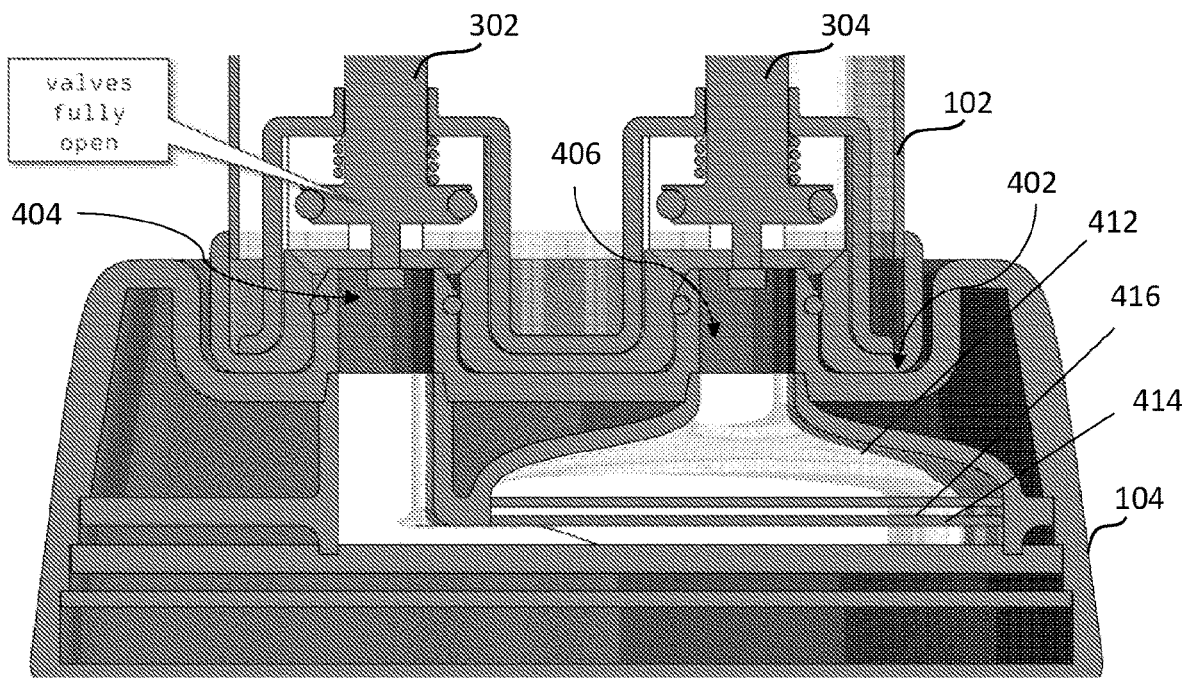

FIG. 9 illustrates the valves 302 and 304 partially open as the vessel 102 continues to slide into the cavity 402 of the base portion 104. Finally, FIG. 10 shows the vessel 102 secured within the cavity 402 of the base portion 104. At this point, the valves 302 and 304 are fully open, thereby allowing liquid from the vessel 102 to flow through the inlet portion 404 and into the base portion 104. It is noted that this flow is in one direction. That is, liquid flows from the vessel 102 and into the base portion 104 via the base portion inlet 404. To prevent liquid from flowing into the base portion 104 via the base portion outlet 406, the outlet 406 or the valve 304 may be configured with a ball-check valve, for example.

Once the vessel 102 is connected with the base portion 104 such that the liquid flows into the base portion 104, a power source may supply power to the anode(s) 414 and cathode(s) 416 to initiate electrolysis. In some embodiments, the system 100 produces hypochlorous acid and/or sodium hydroxide using electricity passing between the anode(s) 414 and the cathode(s) 416.

Before the chemical reaction and as discussed above, the starting solution in the vessel 102 may contain water (H₂O), sodium chloride (salt), and vinegar. Once power is supplied to the anode(s) 412 and the cathode(s) 414, an electrical current breaks apart the molecules of the starting solution to form sodium hydroxide and hypochlorous acid in accordance with the following equation:

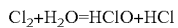

$$Cl_2 + H_2O = HClO + HCl$$

In some embodiments, system 100 may include a power source that is capable of producing up to 9V. The power source may be configured within the base portion 104 or otherwise in operable communication with the base portion 104. The amount of power supplied may of course vary and depend on the desired operational specifications.

For example, a 9 volt power source may provide 290 mAh to the anode(s) 414 and cathode(s) 416. With this amount of charge, the system 100 may produce the solution in approximately six minutes and thirty seconds. A lower amount of power may nonetheless produce the solution but require more time (e.g., up to ten minutes).

The chemical reaction occurring within the housing 412 therefore produces at least one of bubble flow and the product solution. The housing 412 is operably shaped and positioned to force the bubble flow and/or the product solution out of the housing 412, through the base portion outlet 406, and into the vessel 102.

The interior of the housing 412 may also be coated with or otherwise include a friction-reducing agent to facilitate the flow of bubbles and the produced solution out of the housing 412. It is noted that this flow is also in one direction.

Figure 11:
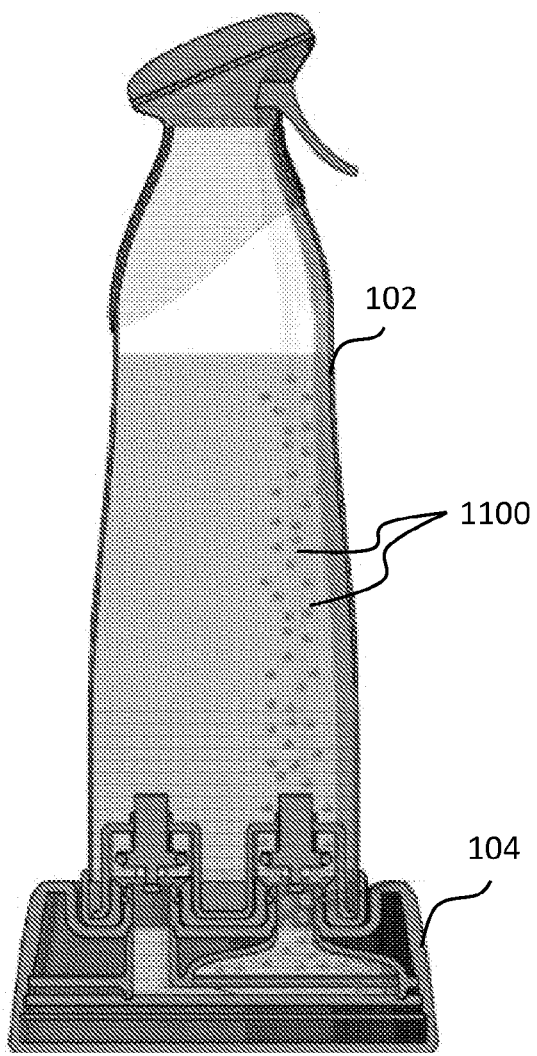
FIGS. 11 and 12 illustrate the flow of bubbles and product solution in the vessel in accordance with one embodiment.

FIG. 11 illustrates the vessel 102 connected with the base portion 104 during the electrolysis process. As seen in FIG. 11, bubbles and/or product solution 1100 emanate from the housing 412 and spread into the vessel 102.

Figure 12:
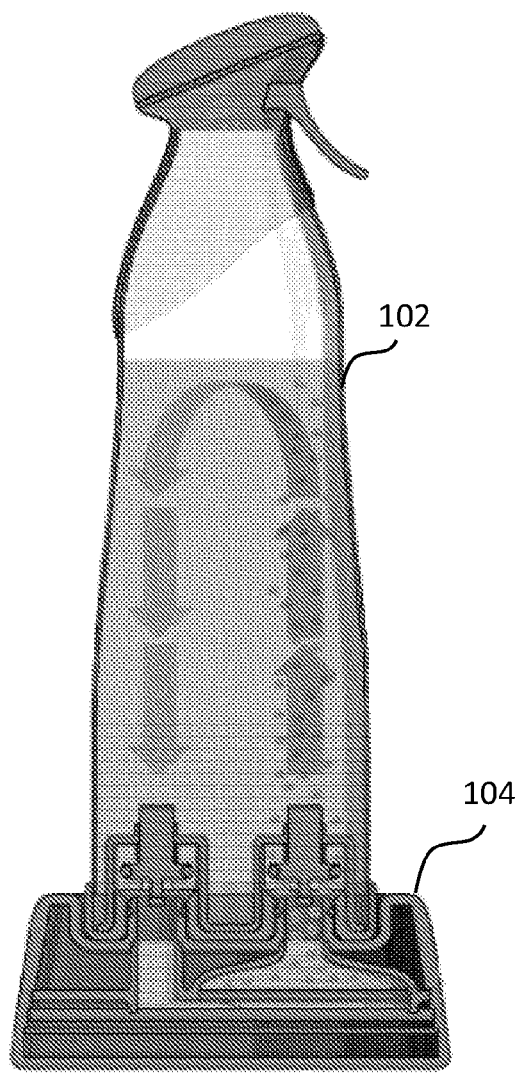

Additionally, the electrodes dissipate heat energy into the water. The rising bubble flow and the warmer water create a thermal syphon, as indicated by the arrows in FIG. 12. This syphon acts to circulate water back into the base portion 104 via the base inlet 404. This process continues until the vessel 102 is at least substantially filled with the product solution of sodium hydroxide and hypochlorous acid.

Figure 13:
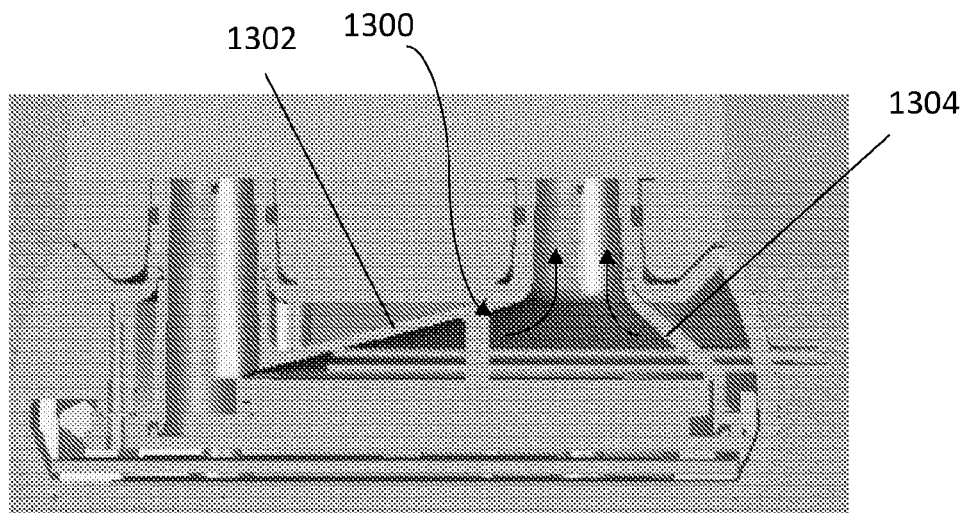
FIG. 13 illustrates a housing for the anode(s) and cathode(s) in accordance with one embodiment.

The shape of the housing 412 may vary to force the bubbles and product solution into the vessel 102. For example, FIG. 13 illustrates a housing 1300 in accordance with one embodiment. In this embodiment, the roof or top portions 1302 and 1304 have different slopes and are angled differently than the housing 412 of FIG. 4. This particular configuration may encourage or otherwise force the bubbles to more easily flow up and out of the housing 1300 (indicated by arrows).

Accordingly, by angling the housing 1300 appropriately, the bubbles and product solution may move out of the housing 1300 and into the vessel 102 without pumping. This saves power, as a mechanical or electrical pump is not required.

Once the vessel 102 filled with the product solution, a user may detach the vessel 102 from the base portion. The user may then use a dispenser (such as the dispenser 108) configured with the vessel 102 to dispense the product solution out of the vessel 102 and onto a surface for cleaning.

Figure 14:
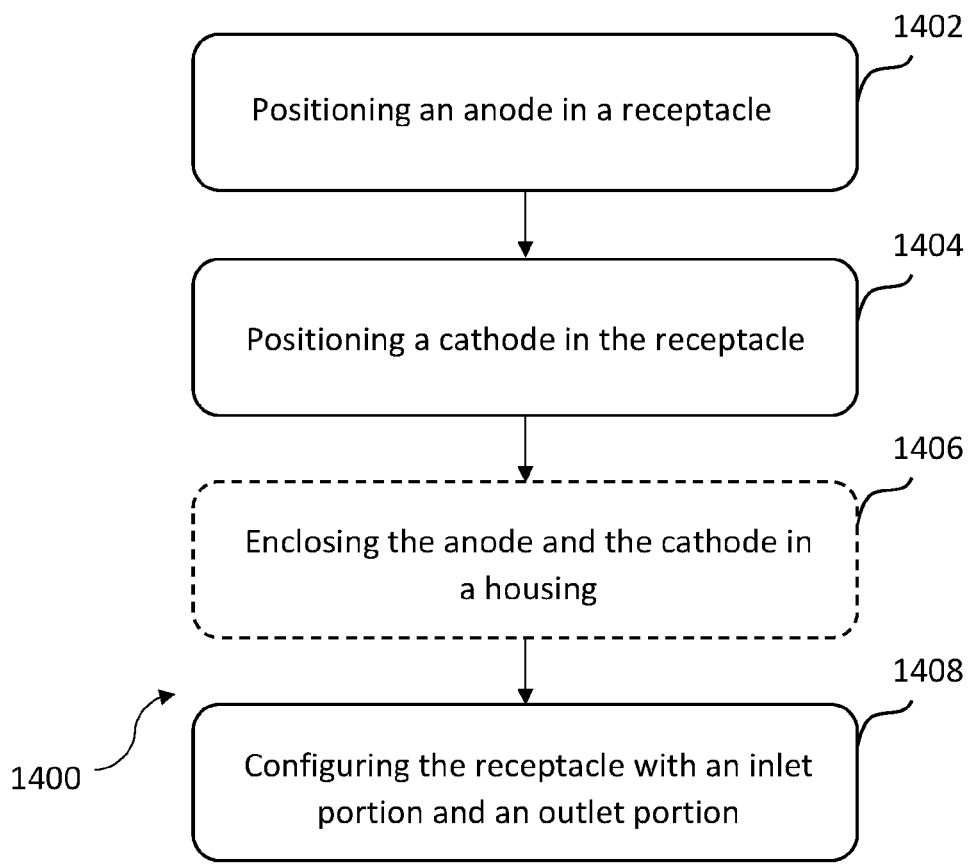
FIG. 14 depicts a flowchart of a method of manufacturing a solution production device in accordance with one embodiment.

FIG. 14 depicts a flowchart of a method 1400 of manufacturing a solution production device in accordance with one embodiment. Step 1402 involves positioning an anode in a receptacle such as the base portion 104 of FIGS. 1, 2, and 4. The anode may be similar to the anode(s) 414 of FIG. 4.

Step 1404 involves positioning a cathode in the receptacle. The cathode may be similar to the cathode(s) 416 of FIG. 4.

Step 1406 involves enclosing the anode and the cathode in a housing. The housing may be similar to the housing 412 of FIG. 4.

Step 1408 involves configuring the receptacle with an inlet portion and an outlet portion. These portions may be similarly configured to the inlet and outlet portions, 404 and 406, respectively, of FIG. 4. In these embodiments, the inlet portion is configured to allow a liquid from a vessel to enter the receptacle (such as the base portion 104 of FIG. 4) upon the receptacle receiving the vessel, and the outlet portion is configured to allow a product of an electrochemical reaction between the cathode, anode, and the liquid to enter the vessel without pumping.

Figure 15:
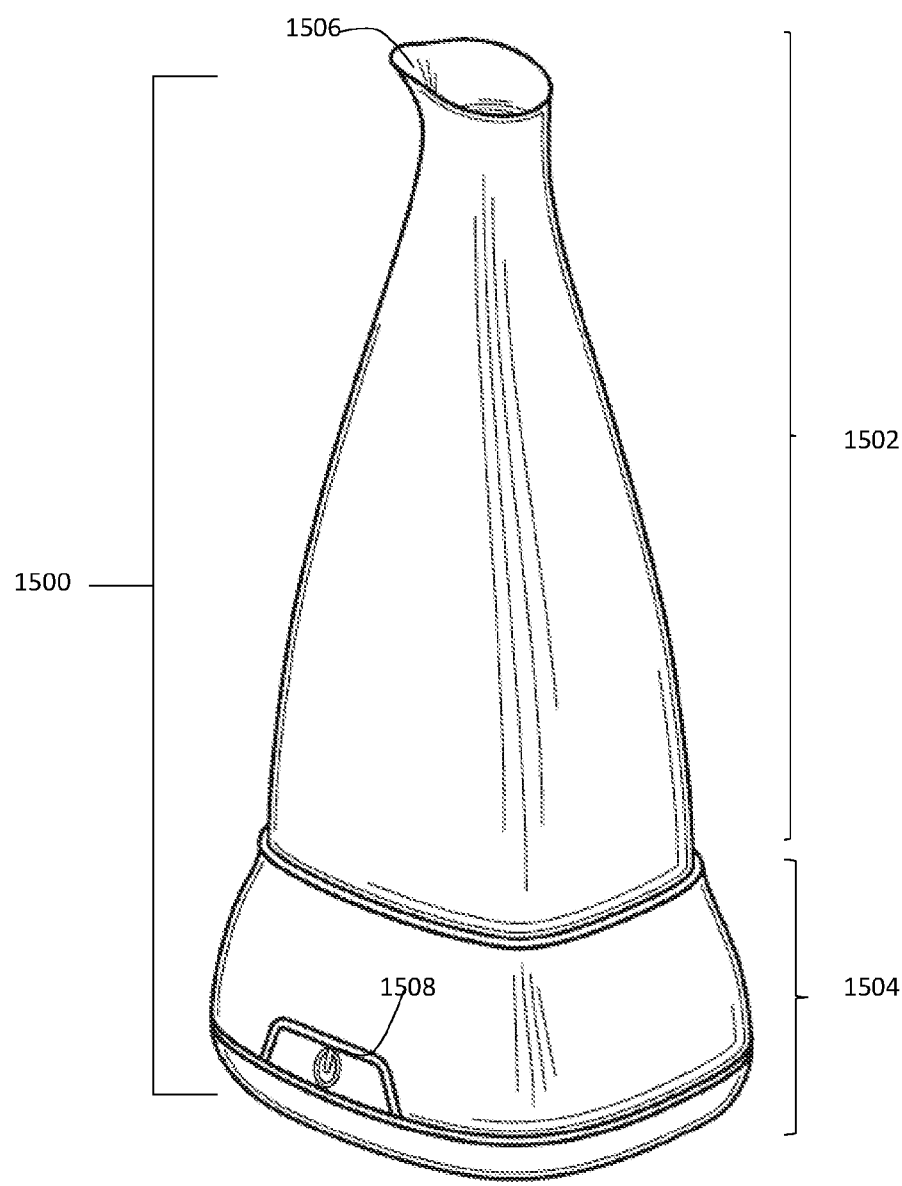
FIG. 15 illustrates a perspective view of a solution production system in accordance with one embodiment.

FIG. 15 illustrates a perspective view of a solution production system 1500 in accordance with one embodiment. In some embodiments, the vessel 1502 may be detachable from the base portion 1504. The vessel 1502 may include a pour spout 1506 to dispense a liquid or cleaning solution from the vessel 1502. In some embodiments, the base portion 1504 may include a power button 1508 to begin electrolysis of a liquid contained in the vessel 1502.

Figure 16:
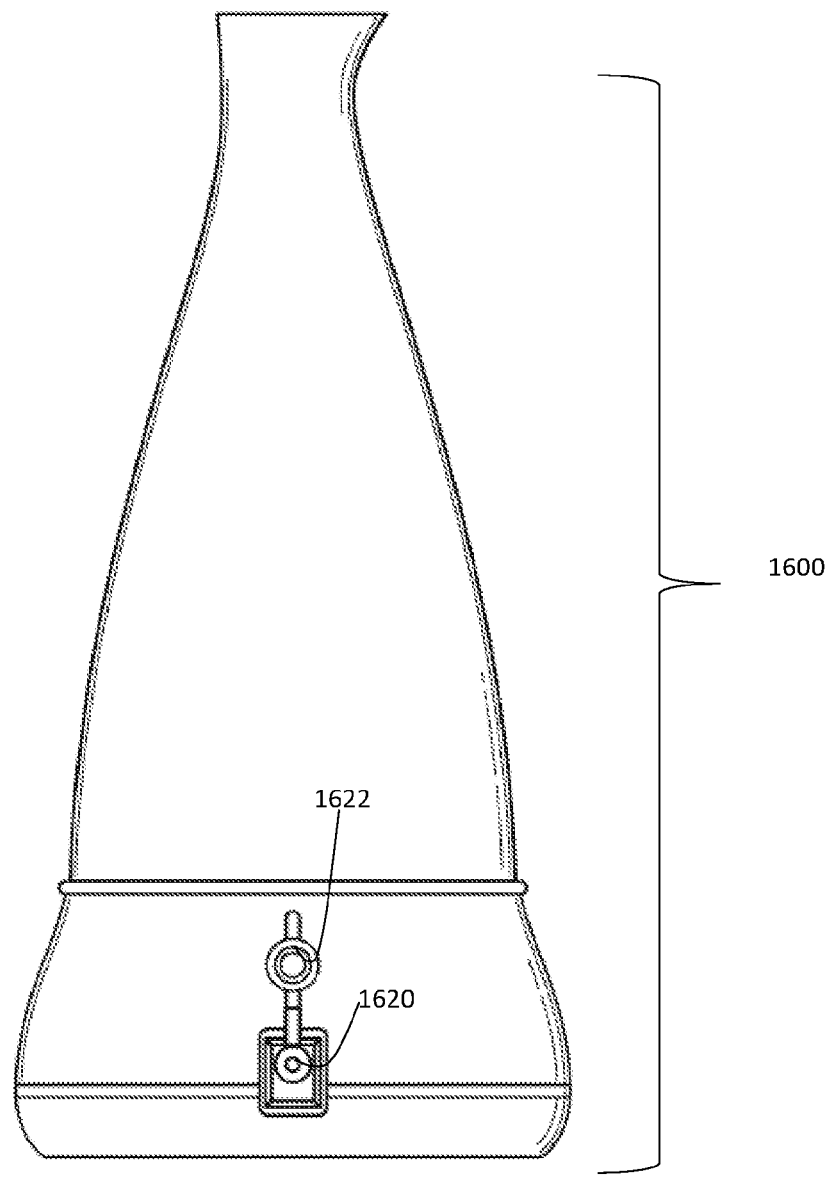
FIG. 16 illustrates a perspective view of a solution production system with an electrical port in accordance with one embodiment.

FIG. 16 illustrates a perspective view of a solution production system 1600 with an electrical port 1620 in accordance with one embodiment. In some embodiments, the port 1620 has a cap 1622 configured to act as a water-proof seal for the port 1620 when the solution production system 1600 is not plugged into an electrical outlet. In some embodiments, the electrical port 1620 may be used for an external source of power. In some embodiments, the solution production system 1600 may be able to retain a charge after being plugged into an external source of power.

Figure 17:
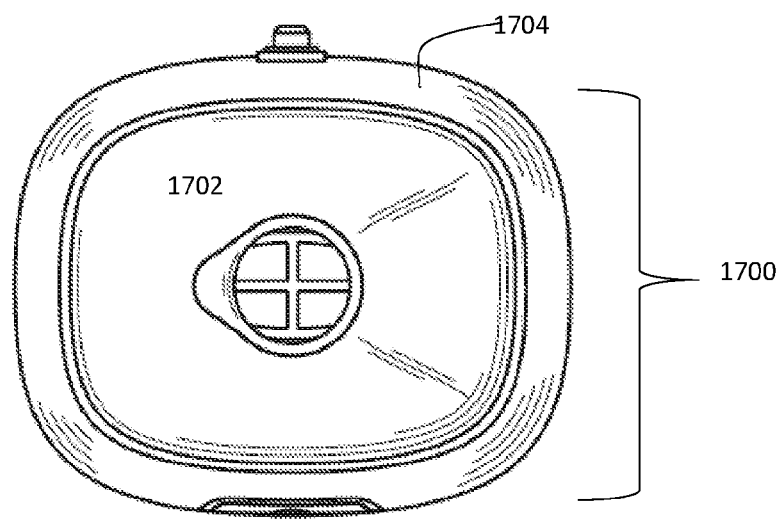
FIG. 17 illustrates a top view of a solution production system in accordance with one embodiment.

FIG. 17 illustrates a top view of a solution production system 1700 in accordance with one embodiment. In some embodiments, the vessel 1702 is opened to the base 1704. In some embodiments, liquid in the vessel 1702 may circulate through the base 1704 and electrolysis from the base may transform the liquid into a cleaning solution, as described more above.

Figure 18:
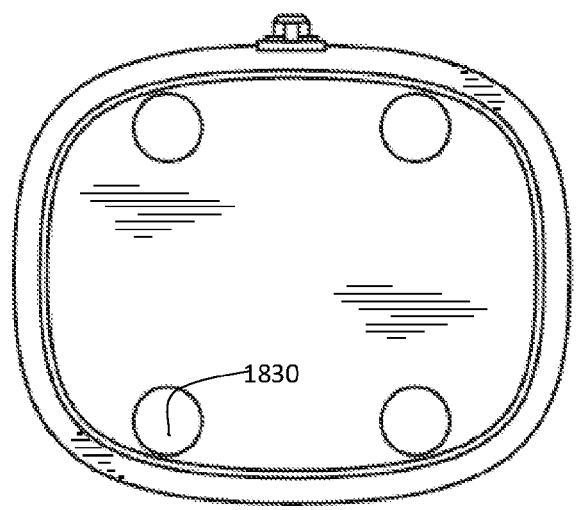
FIG. 18 illustrates a bottom view of a solution production system in accordance with one embodiment.

FIG. 18 illustrates a bottom view of a solution production system in accordance with one embodiment. In some embodiments, the solution production system base may have non-slip feet 1830 to prevent the system from sliding. In some embodiments, the feet may be made of rubber, plastic, silicon, felt, foam, or any combination thereof.

Figure 19:
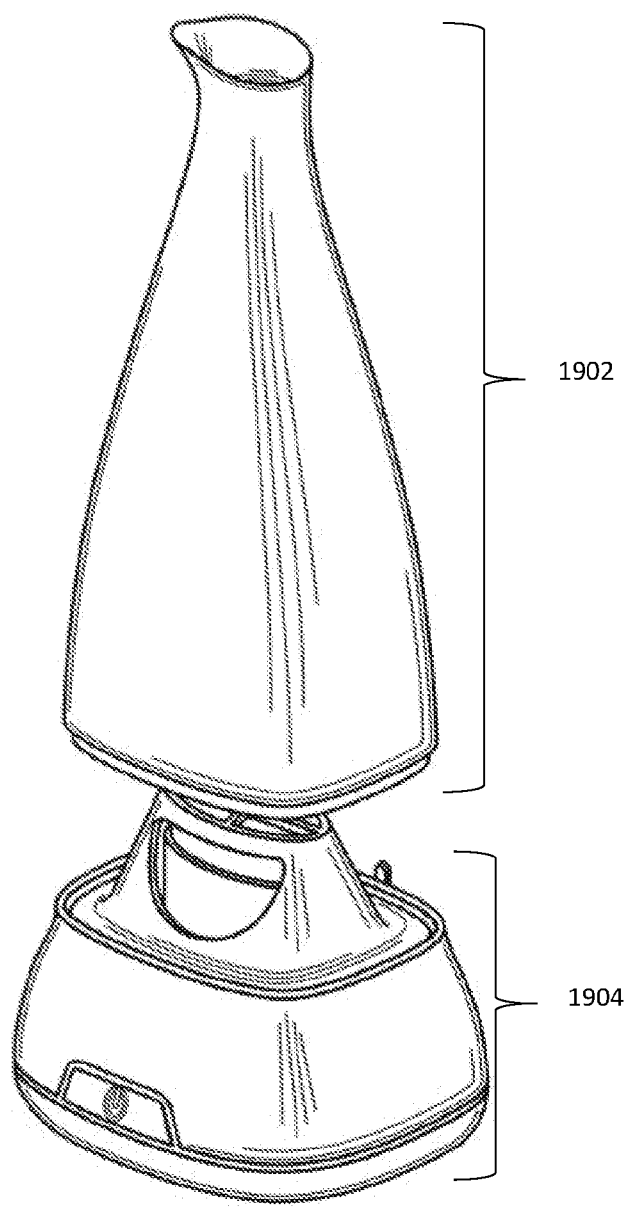
FIG. 19 illustrate an exploded drawing of a base and a top of a solution production system in accordance with one embodiment.

FIG. 19 illustrates an exploded drawing of a base 1904 and a top 1902 of a solution production system in accordance with one embodiment. In some embodiments, the vessel may detach from the base. In some embodiments, the vessel may attach to the base through grooves or a snap configuration. In some embodiments, the vessel may be hollow when detached from the base. In some embodiments, the base may contain a system to electrolyze liquid in the vessel and in the base.

Figure 20:
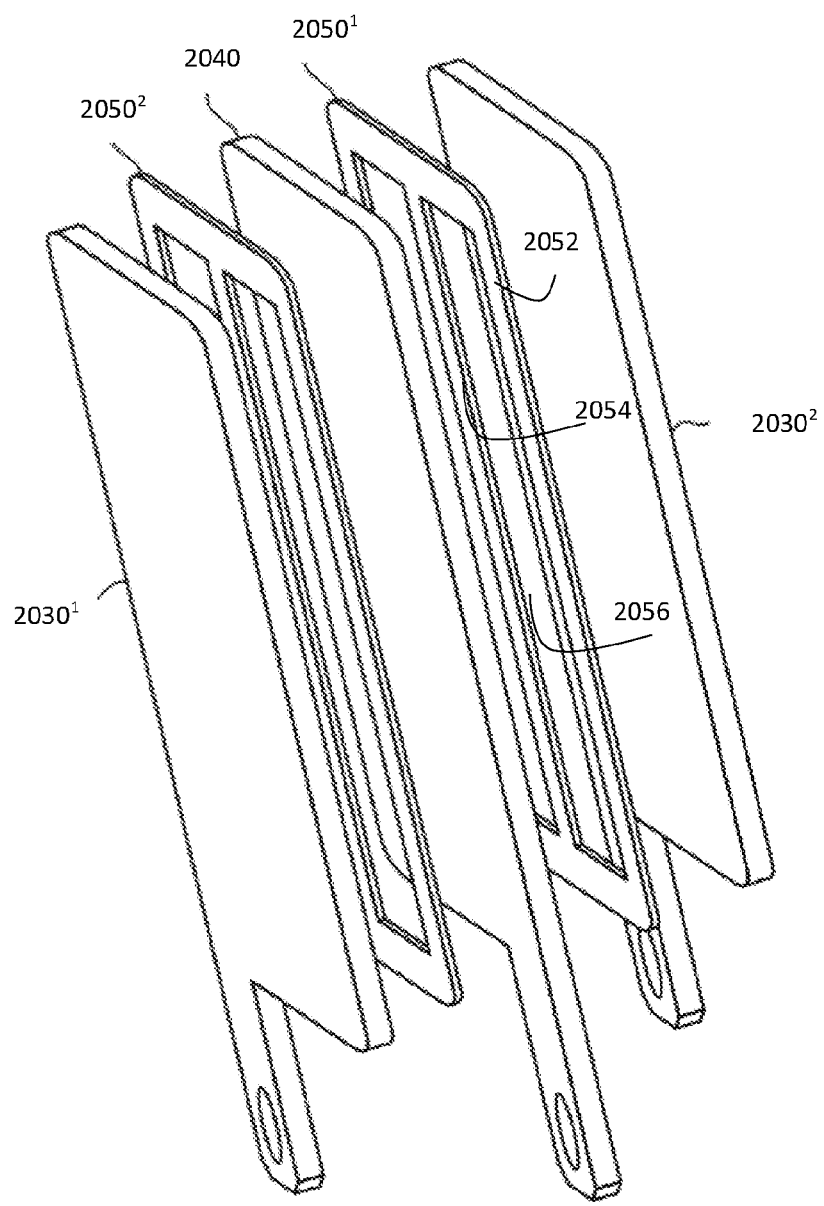
FIG. 20 illustrates electrodes and spacers of a solution production system in accordance with one embodiment.

FIG. 20 illustrates electrodes 2030, 2040 and spacers 2050 of a solution production system in accordance with one embodiment. In some embodiments, the solution production system may have two cathodes $2030^1$, $2030^2$ and one anode 2040 for electrodes. In some embodiments, the cathodes 2030 may be separated from the anode 2040 by spacers $2050^1$, $2050^2$. In some embodiments, the spacers $2050^1$, $2050^2$ are identical in width, height, and length.

In some embodiments, the spacers may be made of a synthetic polymer, such as polytetrafluoroethylene. In some embodiments, the spacers may separate the cathodes $2030^1$, $2030^2$ from the anode 2040 and prevent the device from shorting out during the electrolysis process when liquid is added to the vessel. In some embodiments, the spacers $2050^1$, $2050^2$ may comprise a mesh material. The mesh material may allow liquid to flow through the spacers $2050^1$, $2050^2$ from the cathodes $2030^1$, $2030^2$ to the anode 2040. In some embodiments, the mesh material may be located between the solid bars 2052, 2054 of the spacer 2050 in a spacer window 2056.

In some embodiments, the spacers 2050 may have a width of between 30 and 50 mm across. In some embodiments, the spacers 2050 may have a width of 40 mm across. In some embodiments, the spacers 2050 may have a width of 46 mm across. In some embodiments, the spacers 2050 may have a width of approximately 39 mm and a height of approximately 46 mm. In some embodiments, the spacers 2050 may have a depth between 0.2 mm and 5 mm. In some embodiments, the spacers 2050 may have a depth between 0.2 mm and 10 mm. In some embodiments, the spacers may have a depth greater than 1 mm. In some embodiments, the spacers may have a depth less than 2 mm. In some embodiments, the spacers may have a depth of 1.2 mm.

In some embodiments, the spacers 2050 may comprise two windows $2056^1$, $2056^2$ in the spacers 2050, forming in the spacer material, a peripheral bar 2052 and a middle bar 2054 between the two windows. In some embodiments, the peripheral bar 2052 and the middle bar 2054 may have the same width. In some embodiments, the width of each bar 2052, 2054 may be approximately 2.5 mm. In some embodiments, the spacer window 2056 between the peripheral bar and the middle bar may be approximately 15.75 mm wide. In some embodiments, the spacers 2050 may be slightly larger than the anode 2040 and cathodes 2030.

In some embodiments, the spacers 2050 are configured to provide a complete separation between the anode 2040 and the cathodes 2030. In some embodiments, the spacers 2050 promote the movement of ions from anode 2040 to cathodes 2030 on charge and the reverse on discharge.

In some embodiments, the configuration of the spacers 2050 may allow the flow of electrolyte solution though the base of the solution production system. In some embodiments, the configuration of the spacers 2050 may promote disengagement of gases produced during electrolysis through the flow of the electrolyte through the windows of the spacers.

In some embodiments the separator is designed to be as thin as possible to not add dead volume to the cell. Additionally, in some embodiments, the separators 2050 are configured to allow for uniform wetting and further configured to prevent dry areas. In batteries, dry areas may create hot spots leading to cell failure. By keeping the width, length, and height of the bars in the separator 2050 uniform, the cell may be configured to prevent dry areas and shortages. By keeping a uniform window, the ions can exchange between the cathode and anodes. In some embodiments, if the cell were overheating in a local area, the separator 2050 may melt at the point of shorting and provide a local shutdown. Additionally, in some embodiments, the separator 2050 may be approximately equal in size to the electrodes 2030, 2040 to prevent the electrodes 2030, 2040 from contacting each other.

In some embodiments, electrodes 2030, 2040 and spacers 2050 may be in the base of the solution production system. In some embodiments, a brace may be used to stabilize the electrodes 2030, 2040 and spacers 2050 in the base of the solution production system.

The cathodes 2030 and anode 2040 can be constructed from a conductive material that can include at least one coating to act as a catalyst. The conductive material and the coating may be the same for the cathodes 2030 and anode 2040. The cathodes 2030 and/or the anode 2040 can each comprise in whole or in part a conductive screen and/or a perforated conductive material. The cathodes 2030 and anode 2040 may be made of a material comprising at least one electronically conductive material, such as a metal, an oxide, a semi-conductor material, or any combination thereof.

The cathodes 2030 and anode 2040 can be printed on a substrate, such as by thermoforming and/or in-molding techniques. In the context of the present application, "in-molding" refers to a process by which a conductive element is molded within an element that can be plastic or another thermoformable material, and can employ injection molding, thermoforming, casting, and/or blow molding. However, any other technique for forming the cathodes 2030 and anode 2040, whether known now or invented hereafter, may be used as long as cathodes 2030 and anode 2040 can accomplish the features of various embodiments described herein.

The cathodes 2030 and anode 2040 may be in a planar configuration or in a stacked configuration (e.g., a single anode 2040 can be positioned between two anodes $2030^1$, $2030^2$). In some embodiments, the total anode area may be in the range of 1,565 $mm^2$-1,750 $mm^2$.

The cathodes 2030 and anode 2040 may also be separated by at least one insulating material. The exact configuration and type of cathodes 2030 and anode 2040 may vary and include those described in Applicant's U.S. Pat. Appl. Publ. No. 2016/0330968, entitled "SANITIZING PRODUCT CREATION SYSTEM."

Figure 21:
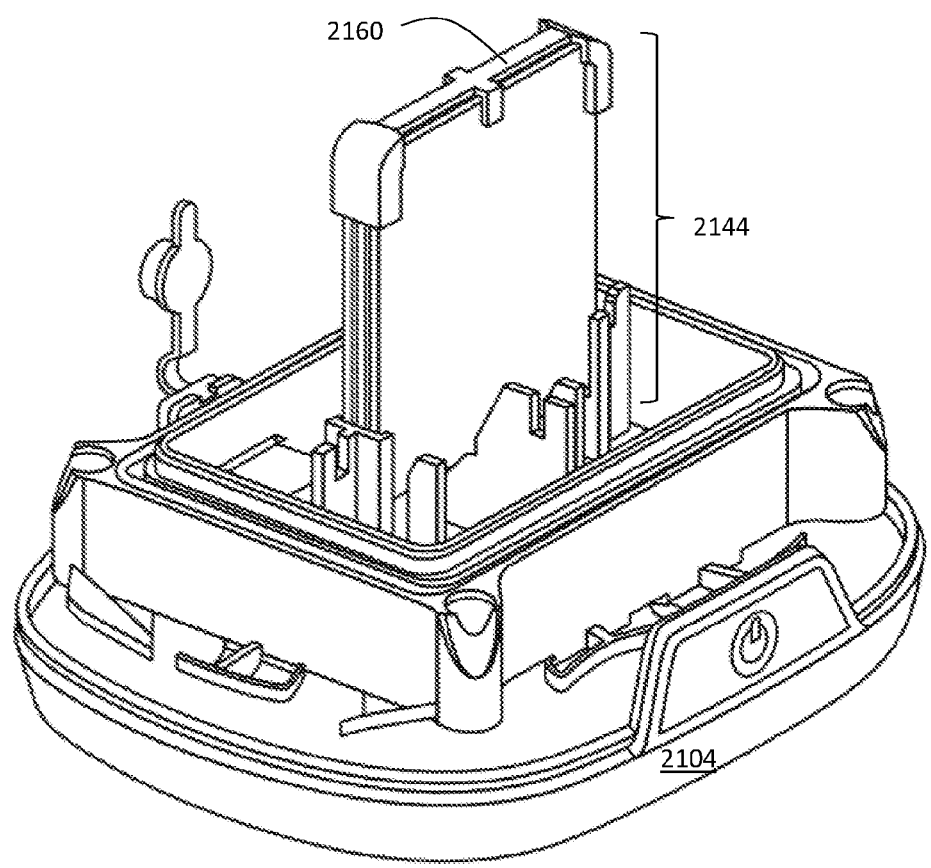
FIG. 21 illustrates electrodes and spacers of a solution production system housed in a base in accordance with one embodiment.

FIG. 21 illustrates electrodes and spacers 2144 of a solution production system housed in a base 2104 in accordance with one embodiment. In some embodiments, the electrodes and spacers 2144 may be attached to the base 2104. In some embodiments, a brace 2160 may keep the flush configuration between the electrodes and spacers.

Figure 22:
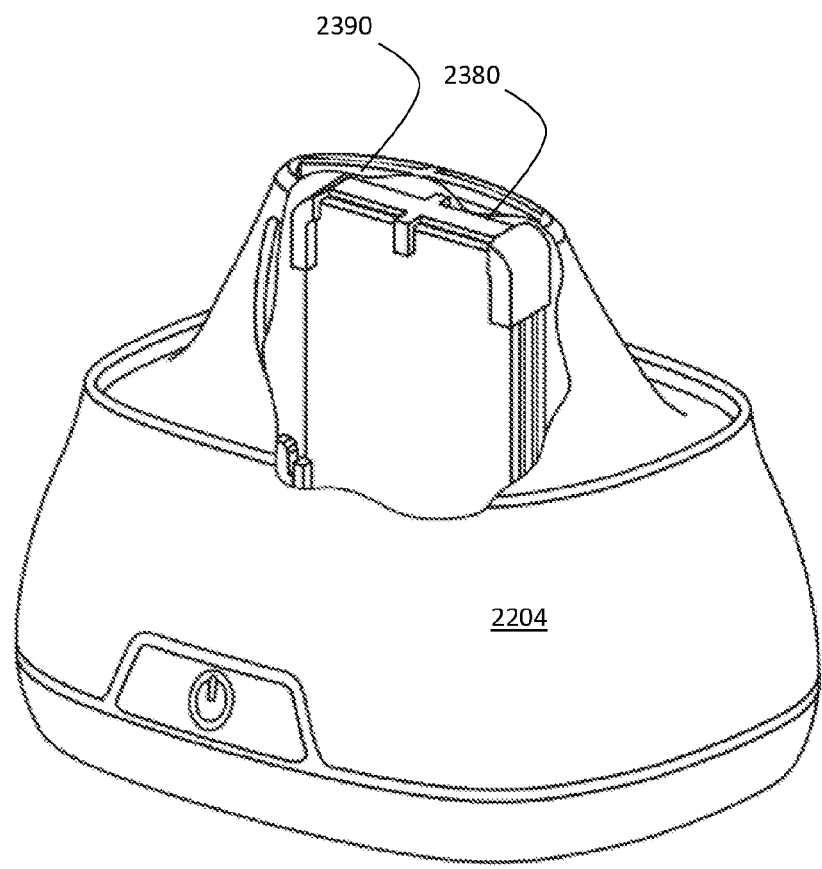
FIG. 22 illustrates electrodes and spacers of a solution production system housed in a base in accordance with one embodiment.

FIG. 22 illustrates electrodes and spacers 2380 of a solution production system housed in a base portion 2204 in accordance with one embodiment. In some embodiments, the electrodes and spacers 2380 are enclosed within the base 2204 of the solution production system. In some embodiments the base may have open windows 2390 in the top of the base to allow liquid to flow from the vessel to the base.

The base portion 2204 may also include any required electronic circuitry (e.g., a printed circuit board) as well as one or more power sources. The power source(s) can produce a current density in the cathodes 2030 and anode 2040 in the range of 100 $mA/cm^2$ to 500 $mA/cm^2$, for example. The circuitry may further include at least one current pass element and/or at least one means to measure current (e.g., a current sense resistor, a Hall Effect sensor, coils, or the like).

The power source can produce a voltage that can favor the production of hypochlorous acid. Hypochlorous acid can be produced at a concentration in the range of 100-500 PPM, or at a concentration that is variable. The power source can produce a voltage that can favor the production of sodium hydroxide. Or, the voltage can produce both sodium hydroxide and hypochlorous acid.

The power source can provide direct current or alternating current. The power source can be an uncontrolled power source and/or supply random AC and/or DC voltage waveforms. The power source can also supply random AC and/or DC voltage waveform components. The direct current can be produced by at least one of a battery, fuel cell, solar cell, thermoelectric source, nuclear source, magnetic generator, or a generator that interacts with any source of mechanical energy. The direct current can be derived from the rectification of alternating current. The direct current can be half-wave or full-wave rectified alternating current. The direct current can be transformed using a control circuit and/or electronics to produce a predominantly constant current.

The power source(s) can include a transformer and/or power and/or voltage transformation system. The power source can produce a voltage between +10.5 and −10.5 volts, and the direct current can result in the creation of a variable current. The current density in the cathodes 2030 and anode 2040 can be in the range of 100-500 $mA/cm^2$, for example.

The base portion 2204 may include a means to measure pH by producing at least one pH signal. The pH signal can be used to provide feedback and/or to determine when to terminate a reaction by switching current off and/or altering the flow of current between the electrodes.

The systems, methods, and apparatuses described herein can further include the ability to control and/or alter the pH of at least one liquid or a solution containing reactants. As discussed in more detail below, the starting liquid can be water from any source mixed with at least one additive and/or distilled water mixed with the additive(s). The additive(s) can include salt and/or acid.

The acid may be a weak acid of an organic salt including, but not limited to, at least one of acetic acid, citric acid, lactic acid, and malic acid. The acid(s) can be between 0.001% and 26% by weight in total solution concentration.

The salt can be at least one chloride containing salt derived from the class of alkali metals or equivalents including but not limited to sodium chloride, lithium chloride, potassium chloride, cesium chloride, and rubidium, chloride, pseudo alkali metals or equivalents including but not limited to ammonium chloride. The at least one salt can be between 10 PPM and 20,000 PPM in total solution concentration.

The additive can be a self-contained and/or premixed mixture stored in packets that is added to a quantity of water in the vessel 1904 shown in FIG. 19 or the base portion 2204. The additive can further include a water softener.

Figure 23:
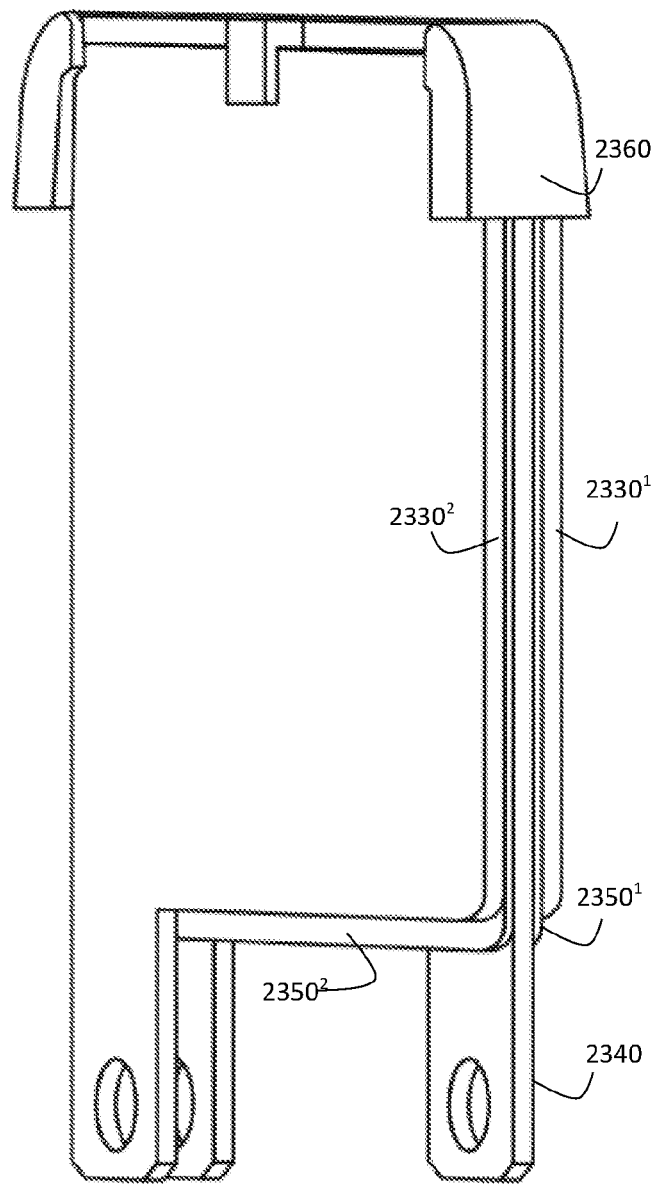
FIG. 23 illustrates connected electrodes and spacers in accordance with one embodiment.

FIG. 23 illustrates connected electrodes 2330, 2340 and spacers 2350 in accordance with one embodiment. In some embodiments, each spacer 2350 may sit flush to the electrodes 2330, 2340. In some embodiments, the space between the spacers 2350 and electrodes 2330, 2340 may be kept stable by a brace 2360. In some embodiments, the size of the spacers 2350 may prevent the electrodes 2330, 2340 from shorting out during electrolysis. In some embodiments, the spacers may have a width 1 mm larger than the electrodes and a length 1 mm larger than the electrodes.

FIGS. 24A-D illustrate a wraparound cathode 2410 and anode 2420 in accordance with one embodiment. In some embodiments, the cathode 2410 may comprise a plurality of connected sections 2430, 2440, 2450 and may at least partially surround the anode 2420 on at least three sides. In some embodiments, the cathode sections 2430, 2440, 2450 may comprise two planar sections 2430, 2440 and one wraparound section 2450. The planar sections 2430, 2440 may be approximately the same width and height as the anode 2420. The cathode 2410 may have at least one anchor 2470 configured to fix the electrode to the base. The anode 2420 may have at least one anchor 2460 configured to fix the electrode to the base.

Figure 24A:
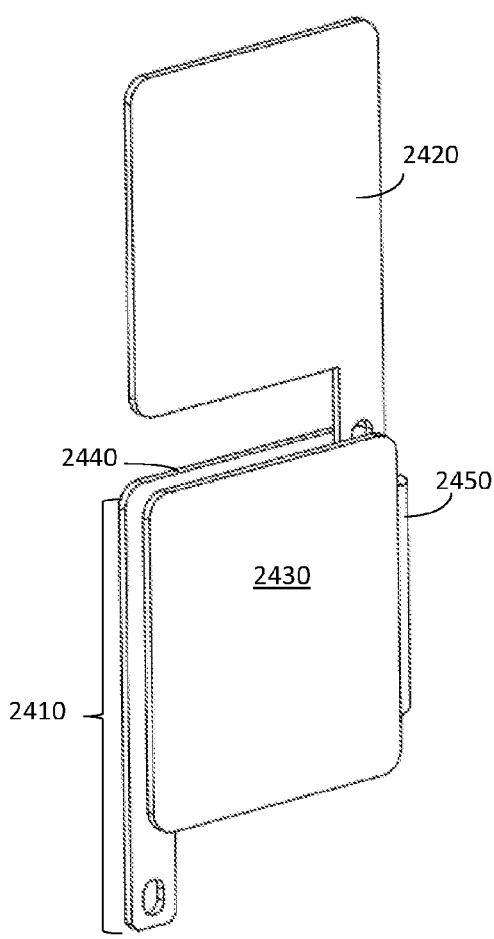
FIGS. 24A-D illustrate a wraparound cathode and anode in accordance with one embodiment.
Figure 24B:
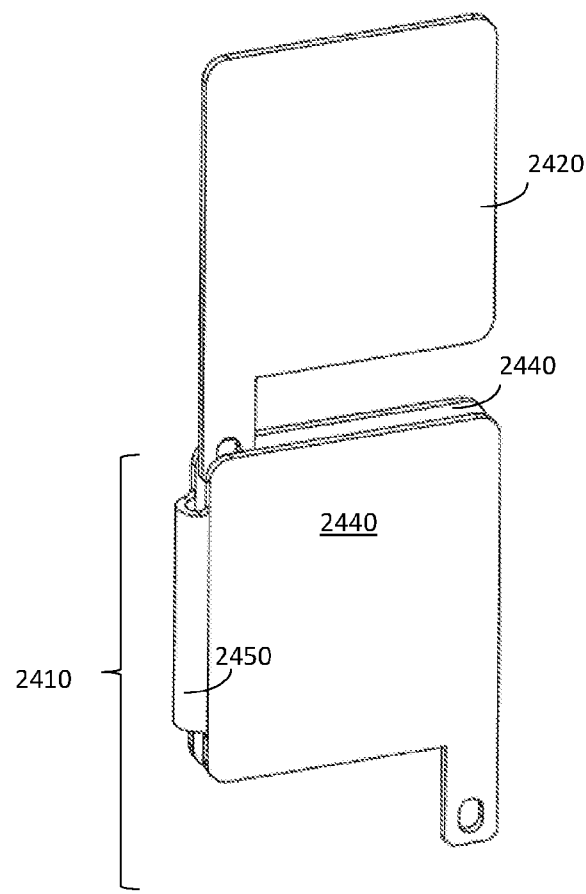
Figure 24C:
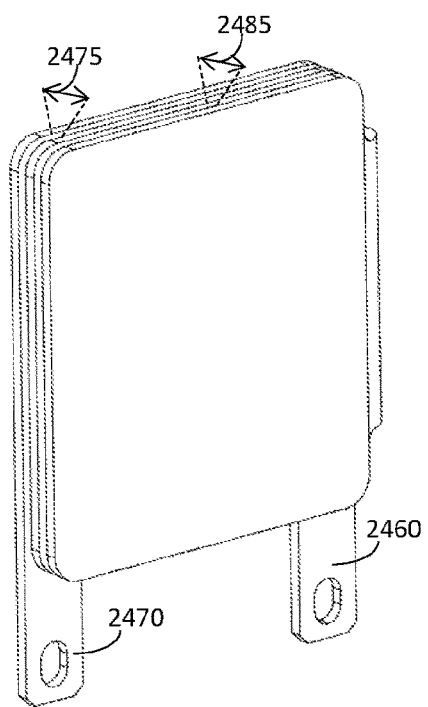
Figure 24D:
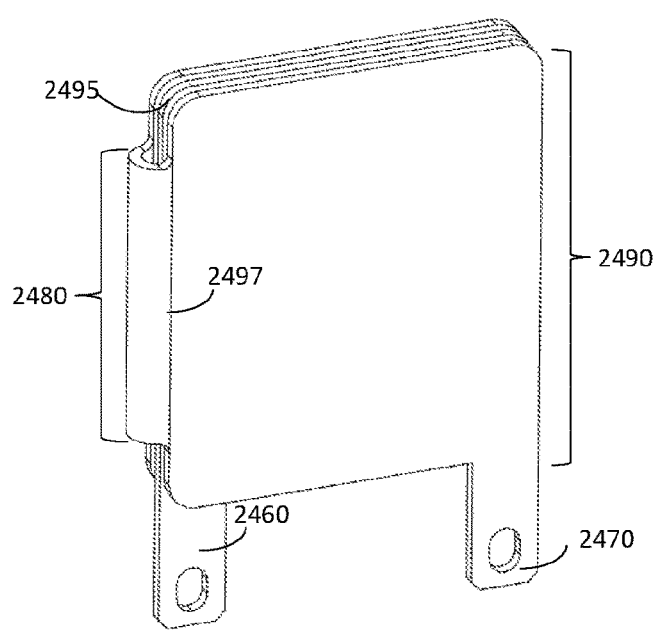

In some embodiments, the wraparound section 2450 may join the planar sections 2430, 2440 and may wrap around at least one portion of the anode 2420, creating a sandwich-like structure of the two planar cathode sections 2430, 2440 and the one anode 2420, as shown in FIGS. 24C and 24D. In some embodiments, the wraparound section 2450 and the planar sections 2430, 2440 of the cathode 2410 are a fixed distance from the anode 2420. In some embodiments, the wraparound section 2450 may not have the same height 2480 as the height 2490 of the planar sections 2430, 2440 of the cathode 2410. In other embodiments, the wraparound section 2450 may have the same height 2480 as the height 2490 of the planar sections 2430, 2440 of the cathode 2410. The anchor of the anode 2460 may be placed close to the wraparound section 2450 of the cathode 2410 and away from the anchor 2470 of the cathode 2410. In some embodiments, the edge of the anode with the anchor 2495 may be in the same plane as the joinder 2497 of the cathode planar sections 2430, 2440 and the wraparound section 2450. In some embodiments, the wrap around cathode 2410 may not enclose the anode 2420 and may leave open at least one edge of the anode 2420.

In some embodiments, spacers 2050 shown in FIG. 20 may be added in the gaps 2475, 2485 between the wraparound cathode 2410 and anode 2420. In some embodiments, the gaps 2475 are equal gaps. The gap 2475 between the cathode 2410 and anode 2420 may range from 0.2 mm to 5 mm. In some embodiments, the gap 2475 may be greater than 0.3 mm. In some embodiments, the gap 2475 may be less than 2 mm. In some embodiments, the gap 2475 may be less than 1.2 mm. In some embodiments, the gap 2475 may be greater than 1 mm. In some embodiments, the gap 2475 may be between 0.2 mm and 10 mm. In some embodiments, the distance between the cathode sections 2430, 2440 may be less than 20 mm. In some embodiments, the distance between the cathode sections 2430, 2440 may be greater than 1 mm. The space between the cathode 2410 and anode 2420 preserved by the spacer 2050 may increase total cell life of the system by reducing corrosion and dissolution of the electrodes. The spacers 2050 may fill the entire gap 2475, 2485 between the cathode 2410 and anode 2420 in some embodiments.

In some embodiments, the spacing between the cathode 2410 and the anode 2420 promotes efficient electrolysis. Too narrow a space between the cathode 2410 and the anode 2420 may result in fouling of the electrodes and shut down of the cell. Too large a space between the cathode 2410 and the anode 2420 may result in excessive current draw, a loss of chlorine production efficiency, and a lower-functioning cell.

Figure 25:
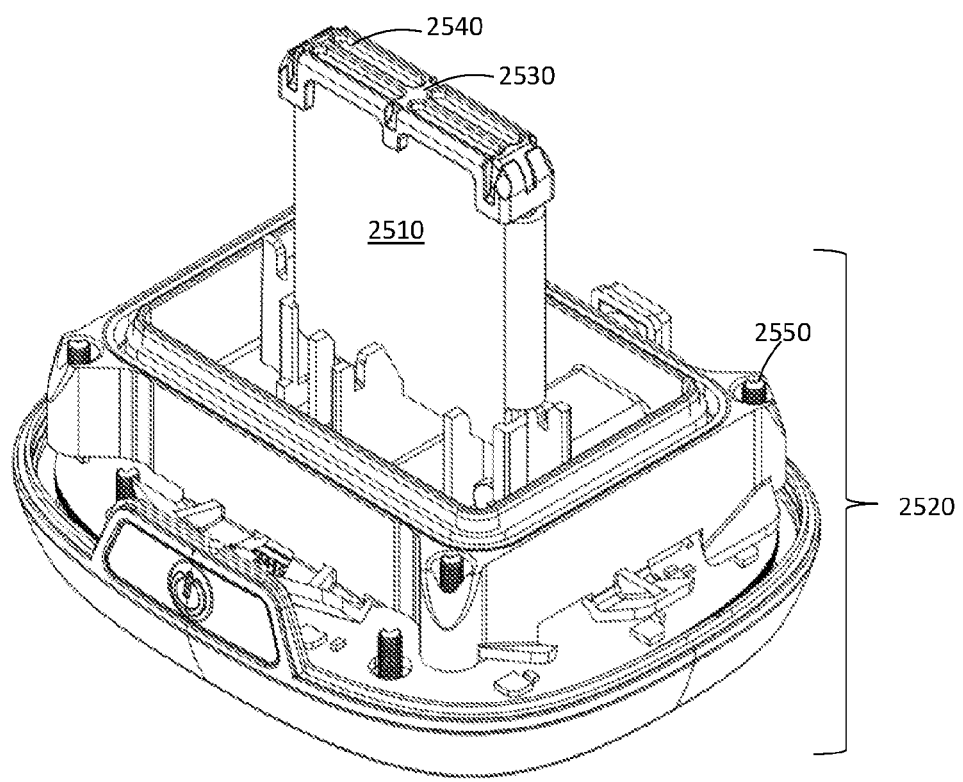
FIG. 25 illustrates a wraparound cathode and anode of a solution production system housed in a base in accordance with one embodiment.

FIG. 25 illustrates a wraparound cathode 2510 and anode of a solution production system housed in a base 2520 in accordance with one embodiment. In some embodiments, a brace 2530 may be placed over the cathode 2510 and anode. In some embodiments, the brace 2530 may also preserve spacing between the cathode 2510 and anode. In some embodiments, the brace 2530 may be placed over spacers, a cathode 2510, and an anode. In some embodiments, there may be four distinct openings 2540 in the brace 2530. In other embodiments, there may be two openings 2540 in the brace. In some embodiments, the openings 2540 may be covered with mesh. In some embodiments, the mesh may be a conductive metal material.

Some embodiments may use screws 2550 to affix the base cap to the bottom of the solution production system. In some embodiments, the base cap may be affixed to the bottom of the solution production system with glue or welding. In some embodiments, the base 2520 is shaped to support the wraparound cathode 2510.

Figure 26:
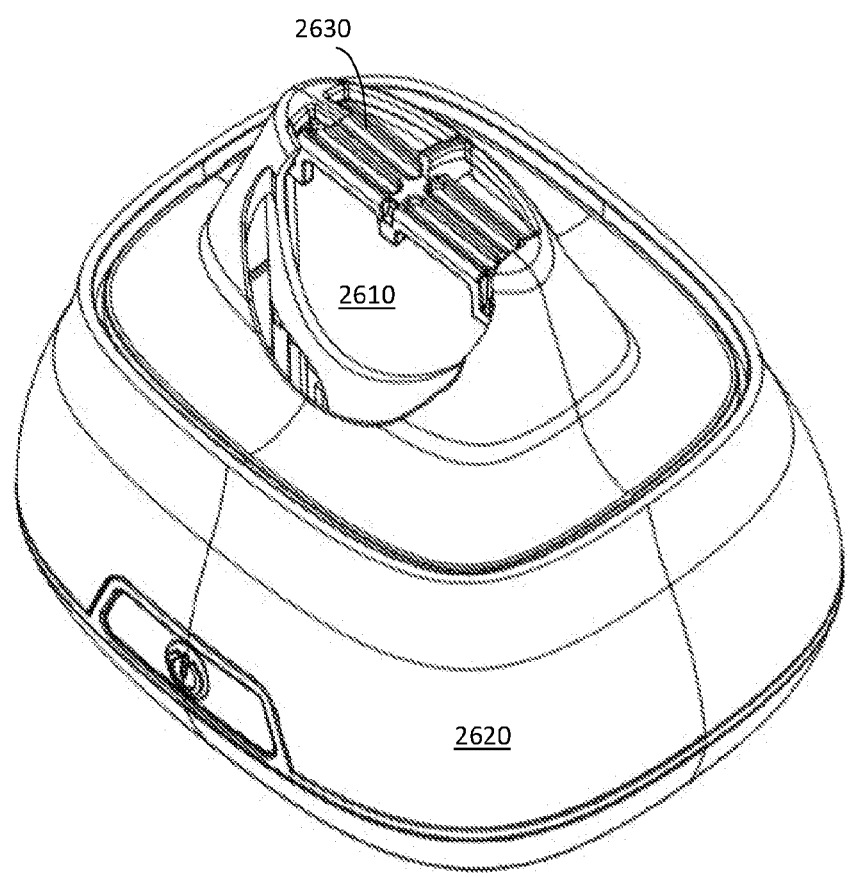
FIG. 26 illustrates a wraparound cathode and anode of a solution production system housed in a base in accordance with one embodiment.

FIG. 26 illustrates a wraparound cathode 2610 and anode of a solution production system housed in a base 2620 in accordance with one embodiment. In some embodiments, the electrodes and spacers are enclosed within the base 2620 of the solution production system. In some embodiments the base 2620 may have open windows 2630 in the top of the base to allow liquid to flow from the vessel to the base 2620.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A solution production system, the system comprising:
a vessel configured to contain a liquid, the vessel having a base portion comprising:
  a cathode having two planar sections having adjacent edges and a wraparound section joining the two planar sections at their adjacent edges;
  an anode positioned between the two planar sections of the cathode;
  two spacers, one on each side of the anode, separating the anode from the cathode to facilitate an electrochemical reaction with the liquid to produce at least one of a bubble flow and a product solution; and
  a brace placed over the top edge the cathode, the anode, and the spacers so as to maintain the spacing between the anode and the cathode,
wherein the base portion is configured to transport the at least one of the bubble flow and the product solution from the base portion into the vessel without pumping.

2. The system of claim 1 wherein the cathode and the anode are fixedly attached to the base portion.

3. The system of claim 2 wherein the cathode and the anode are ultrasonically welded to the base portion.

4. The system of claim 1 wherein the brace has at least one opening.

5. The system of claim 1 wherein the base portion further comprises an electrical port and a waterproof seal over the electrical port.

6. The system of claim 1 wherein the anode is positioned between the two planar sections of the cathode such that a top edge of the anode is co-planar with each top edge of the two planar sections of the cathode.

7. The system of claim 1 wherein the base portion further comprises a mesh covering and the base portion is configured to transport the at least one of the bubble flow and the product solution through the mesh covering.

8. The system of claim 1 wherein the first perimeter spacer comprises a solid median bar and a perimeter, and the median bar has the same width and thickness as the perimeter.

9. The system of claim 6 wherein:
a first planar section of the cathode is positioned at a distance from the anode; and
the distance is greater than 0.2 mm and less than 1 cm.

10. A method of manufacturing a solution production device, the method comprising:
positioning an anode in a base portion;
positioning two spacers, one on each side of the anode, in the base portion;
positioning a cathode having two planar sections having adjacent edges and a wraparound section joining the two planar sections at their adjacent edges in the base portion spaced apart from the anode by the two spacers;
attaching a vessel to the base portion; and
attaching a brace over the top edge of each of the cathode, the anode, and the spacers, so as to maintain the spacing between the anode and the cathode,
wherein the base portion is configured to transport a product of an electrochemical reaction with the cathode, the anode, and a liquid to the vessel without pumping.

11. The method of claim 10 wherein the brace has at least one opening.

12. A solution production device, the device comprising:
a base portion having a cathode having two planar sections having adjacent edges and a wraparound section joining the two planar sections at their adjacent edges, an anode positioned between the two planar sections of the cathode; and two spacers, one on each side of the anode, separating the anode from the cathode to generate, upon receiving an electrical current, an electrochemical reaction with a liquid to produce at least one of a bubble flow and a product solution;
a brace placed over the top edge of each of the cathode, the anode, and the spacers so as to maintain the spacing between the anode and the cathode; and
a container fixedly attached to the base portion and configured to receive without pumping the at least one of the bubble flow and the product solution from the base portion.

13. The device of claim 12 further comprising a power source configured to apply the current to the anode and the cathode to generate the electrochemical reaction.

14. The device of claim 12 wherein
the anode is positioned between the two planar sections of the cathode such that a top edge of the anode is co-planar with each top edge of the two planar sections of the cathode.

15. The device of claim 12 wherein the brace has at least one opening.

16. The device of claim 12 wherein the cathode is configured to enclose the anode on three sides of the anode.

* * * * *